(12) United States Patent
Okutani

(10) Patent No.: US 10,733,925 B2
(45) Date of Patent: Aug. 4, 2020

(54) DISPLAY CONTROL APPARATUS, DISPLAY CONTROL METHOD, AND NON-TRANSITORY COMPUTER-READABLE STORAGE MEDIUM

(71) Applicant: CANON KABUSHIKI KAISHA, Tokyo (JP)

(72) Inventor: Yasuo Okutani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/701,910

(22) Filed: Dec. 3, 2019

(65) Prior Publication Data
US 2020/0105174 A1    Apr. 2, 2020

Related U.S. Application Data

(63) Continuation of application No. PCT/JP2018/042948, filed on Nov. 21, 2018.

(30) Foreign Application Priority Data

Dec. 21, 2017 (JP) .................. 2017-245392

(51) Int. Cl.
*G06T 19/00* (2011.01)
*G06T 15/20* (2011.01)
(Continued)

(52) U.S. Cl.
CPC .............. *G09G 3/06* (2013.01); *G06F 3/0412* (2013.01); *G06T 15/20* (2013.01); *G06T 19/00* (2013.01);
(Continued)

(58) Field of Classification Search
CPC .......... G06T 15/20; G06T 19/00; G06T 1/00; G09G 5/00; G09G 5/36; G09G 5/377; G09G 5/14; H04N 7/18
See application file for complete search history.

(56) References Cited

U.S. PATENT DOCUMENTS

2005/0018045 A1   1/2005 Thomas et al.
2011/0293241 A1*  12/2011 Umeyama ............ G11B 27/105
                                                386/239
2017/0293413 A1  10/2017 Matsushita et al.

FOREIGN PATENT DOCUMENTS

CN      1578435 A    2/2005
CN    101014123 A    8/2007
(Continued)

OTHER PUBLICATIONS

Qiang Yao, et al., Automatic Camera Self-Calibration for Immersive Navigation of Free Viewpoint Sports Video, 2016 IEEE 18th International Workshop on Multimedia Signal Processing (MMSP), 2016, pp. 1-6, Montreal, QC, XP33041409A.
(Continued)

*Primary Examiner* — Abhishek Sarma
(74) *Attorney, Agent, or Firm* — Canon U.S.A., Inc. IP Division

(57) ABSTRACT

A plurality of virtual viewpoint images corresponding to positions and directions of a plurality of virtual viewpoints are displayed on an operation screen for an operation associated with the position and direction of the virtual viewpoint. The virtual viewpoint image corresponding to the virtual viewpoint selected as a position and direction operation target among the plurality of virtual viewpoints is generated based on a plurality of captured images obtained by capturing an image capturing target region by a plurality of cameras, and is transmitted to another apparatus.

25 Claims, 21 Drawing Sheets

(51) Int. Cl.

| | |
|---|---|
| *G09G 5/377* | (2006.01) |
| *G09G 5/14* | (2006.01) |
| *G09G 3/06* | (2006.01) |
| *G06F 3/041* | (2006.01) |
| *G06T 1/00* | (2006.01) |
| *G09G 5/00* | (2006.01) |
| *H04N 7/18* | (2006.01) |

(52) U.S. Cl.
CPC ............... *G09G 5/14* (2013.01); *G09G 5/377* (2013.01); *G06T 1/00* (2013.01); *G09G 5/00* (2013.01); *G09G 2320/068* (2013.01); *H04N 7/18* (2013.01)

(56) References Cited

FOREIGN PATENT DOCUMENTS

| | | |
|---|---|---|
| JP | 2005242606 A | 9/2005 |
| JP | 2011135138 A | 7/2011 |
| JP | 2012-015990 A | 1/2012 |
| JP | 2014-215828 A | 11/2014 |
| JP | 2017208702 A | 11/2017 |
| WO | 2017/057006 A1 | 4/2017 |
| WO | 2017/204174 A1 | 11/2017 |

OTHER PUBLICATIONS

Zhebin Zhang, et al., A Virtual View Genetation Method for Free-Viewpoint Video System, 2007 International Symposium on Intelligent Signal Processing and Communication Systems, Nov. 28-Dec. 1, 2007, pp. 156-159, Xiamen, China, X31211491A.

\* cited by examiner

| VIEWPOINT TYPE | VIEWPOINT ID | POSITION, DIRECTION, ANGLE OF VIEW |
|---|---|---|
| SELECTED VIRTUAL VIEWPOINT | 408 | (-20, -10, 5), (10, -10, 0), 55 |
| SWITCHING VIRTUAL VIEWPOINT | 409 | (-10, 50, 15), (-90, -20, 0), 30 |
| SWITCHING VIRTUAL VIEWPOINT | 410 | (-40, 20, 2), (-40, 0, 0), 45 |
| SWITCHING VIRTUAL VIEWPOINT | 411 | (10, 10, 5), (-140, -5, 0), 40 |
| SWITCHING VIRTUAL VIEWPOINT | 412 | (50, 0, 10), (-180, -10, 5), 45 |
| SWITCHING VIRTUAL VIEWPOINT (NON-DISPLAY) | 413 | (20, 30, 2), (160, 5, 0), 45 |

| VIEWPOINT TYPE | VIEWPOINT ID | POSITION, DIRECTION, ANGLE OF VIEW | FRAME RATE |
|---|---|---|---|
| SELECTED VIRTUAL VIEWPOINT | 408 | (-20, -10, 5), (10, -10, 0), 55 | 60 |
| SWITCHING VIRTUAL VIEWPOINT | 409 | (-10, 50, 15), (-90, -20, 0), 30 | 15 |
| SWITCHING VIRTUAL VIEWPOINT | 410 | (-40, 20, 2), (-40, 0, 0), 45 | 15 |
| SWITCHING VIRTUAL VIEWPOINT | 411 | (10, 10, 5), (-140, -5, 0), 40 | 15 |
| SWITCHING VIRTUAL VIEWPOINT | 412 | (50, 0, 10), (-180, -10, 5), 45 | 15 |
| SWITCHING VIRTUAL VIEWPOINT (NON-DISPLAY) | 413 | (20, 30, 2), (160, 5, 0), 45 | 0 |

FIG. 13A

| FRAME NUMBER | VIRTUAL VIEWPOINT |
|---|---|
| 1 | SELECTED VIRTUAL VIEWPOINT |
| 2 | SWITCHING VIRTUAL VIEWPOINT 1 |
| 3 | SELECTED VIRTUAL VIEWPOINT |
| 4 | SWITCHING VIRTUAL VIEWPOINT 2 |
| 5 | SELECTED VIRTUAL VIEWPOINT |
| 6 | SWITCHING VIRTUAL VIEWPOINT 3 |
| 7 | SELECTED VIRTUAL VIEWPOINT |
| 8 | SWITCHING VIRTUAL VIEWPOINT 4 |
| 9 | SELECTED VIRTUAL VIEWPOINT |
| 10 | SWITCHING VIRTUAL VIEWPOINT 1 |
| 11 | SELECTED VIRTUAL VIEWPOINT |
| 12 | SWITCHING VIRTUAL VIEWPOINT 2 |
| 13 | SELECTED VIRTUAL VIEWPOINT |
| 14 | SWITCHING VIRTUAL VIEWPOINT 3 |
| 15 | SELECTED VIRTUAL VIEWPOINT |
| 16 | SWITCHING VIRTUAL VIEWPOINT 4 |
| 17 | SELECTED VIRTUAL VIEWPOINT |
| 18 | SWITCHING VIRTUAL VIEWPOINT 1 |
| 19 | SELECTED VIRTUAL VIEWPOINT |
| 20 | SWITCHING VIRTUAL VIEWPOINT 2 |

FIG. 13B

| FRAME NUMBER | VIRTUAL VIEWPOINT |
|---|---|
| 21 | SELECTED VIRTUAL VIEWPOINT |
| 22 | SWITCHING VIRTUAL VIEWPOINT 3 |
| 23 | SELECTED VIRTUAL VIEWPOINT |
| 24 | SWITCHING VIRTUAL VIEWPOINT 4 |
| 25 | SELECTED VIRTUAL VIEWPOINT |
| 26 | SWITCHING VIRTUAL VIEWPOINT 1 |
| 27 | SELECTED VIRTUAL VIEWPOINT |
| 28 | SWITCHING VIRTUAL VIEWPOINT 2 |
| 29 | SELECTED VIRTUAL VIEWPOINT |
| 30 | SWITCHING VIRTUAL VIEWPOINT 3 |
| 31 | SELECTED VIRTUAL VIEWPOINT |
| 32 | SWITCHING VIRTUAL VIEWPOINT 4 |
| 33 | SELECTED VIRTUAL VIEWPOINT |
| 34 | SWITCHING VIRTUAL VIEWPOINT 1 |
| 35 | SELECTED VIRTUAL VIEWPOINT |
| 36 | SWITCHING VIRTUAL VIEWPOINT 2 |
| 37 | SELECTED VIRTUAL VIEWPOINT |
| 38 | SWITCHING VIRTUAL VIEWPOINT 3 |
| 39 | SELECTED VIRTUAL VIEWPOINT |
| 40 | SWITCHING VIRTUAL VIEWPOINT 4 |

FIG. 13C

| FRAME NUMBER | VIRTUAL VIEWPOINT |
|---|---|
| 41 | SELECTED VIRTUAL VIEWPOINT |
| 42 | SWITCHING VIRTUAL VIEWPOINT 1 |
| 43 | SELECTED VIRTUAL VIEWPOINT |
| 44 | SWITCHING VIRTUAL VIEWPOINT 2 |
| 45 | SELECTED VIRTUAL VIEWPOINT |
| 46 | SWITCHING VIRTUAL VIEWPOINT 3 |
| 47 | SELECTED VIRTUAL VIEWPOINT |
| 48 | SWITCHING VIRTUAL VIEWPOINT 4 |
| 49 | SELECTED VIRTUAL VIEWPOINT |
| 50 | SWITCHING VIRTUAL VIEWPOINT 1 |
| 51 | SELECTED VIRTUAL VIEWPOINT |
| 52 | SWITCHING VIRTUAL VIEWPOINT 2 |
| 53 | SELECTED VIRTUAL VIEWPOINT |
| 54 | SWITCHING VIRTUAL VIEWPOINT 3 |
| 55 | SELECTED VIRTUAL VIEWPOINT |
| 56 | SWITCHING VIRTUAL VIEWPOINT 4 |
| 57 | SELECTED VIRTUAL VIEWPOINT |
| 58 | SWITCHING VIRTUAL VIEWPOINT 1 |
| 59 | SELECTED VIRTUAL VIEWPOINT |
| 60 | SWITCHING VIRTUAL VIEWPOINT 2 |

F I G. 13D

| FRAME NUMBER | VIRTUAL VIEWPOINT |
|---|---|
| 61 | SELECTED VIRTUAL VIEWPOINT |
| 62 | SWITCHING VIRTUAL VIEWPOINT 3 |
| 63 | SELECTED VIRTUAL VIEWPOINT |
| 64 | SWITCHING VIRTUAL VIEWPOINT 4 |
| 65 | SELECTED VIRTUAL VIEWPOINT |
| 66 | SWITCHING VIRTUAL VIEWPOINT 1 |
| 67 | SELECTED VIRTUAL VIEWPOINT |
| 68 | SWITCHING VIRTUAL VIEWPOINT 2 |
| 69 | SELECTED VIRTUAL VIEWPOINT |
| 70 | SWITCHING VIRTUAL VIEWPOINT 3 |
| 71 | SELECTED VIRTUAL VIEWPOINT |
| 72 | SWITCHING VIRTUAL VIEWPOINT 4 |
| 73 | SELECTED VIRTUAL VIEWPOINT |
| 74 | SWITCHING VIRTUAL VIEWPOINT 1 |
| 75 | SELECTED VIRTUAL VIEWPOINT |
| 76 | SWITCHING VIRTUAL VIEWPOINT 2 |
| 77 | SELECTED VIRTUAL VIEWPOINT |
| 78 | SWITCHING VIRTUAL VIEWPOINT 3 |
| 79 | SELECTED VIRTUAL VIEWPOINT |
| 80 | SWITCHING VIRTUAL VIEWPOINT 4 |

FIG. 13E

| FRAME NUMBER | VIRTUAL VIEWPOINT |
|---|---|
| 81 | SELECTED VIRTUAL VIEWPOINT |
| 82 | SWITCHING VIRTUAL VIEWPOINT 1 |
| 83 | SELECTED VIRTUAL VIEWPOINT |
| 84 | SWITCHING VIRTUAL VIEWPOINT 2 |
| 85 | SELECTED VIRTUAL VIEWPOINT |
| 86 | SWITCHING VIRTUAL VIEWPOINT 3 |
| 87 | SELECTED VIRTUAL VIEWPOINT |
| 88 | SWITCHING VIRTUAL VIEWPOINT 4 |
| 89 | SELECTED VIRTUAL VIEWPOINT |
| 90 | SWITCHING VIRTUAL VIEWPOINT 1 |
| 91 | SELECTED VIRTUAL VIEWPOINT |
| 92 | SWITCHING VIRTUAL VIEWPOINT 2 |
| 93 | SELECTED VIRTUAL VIEWPOINT |
| 94 | SWITCHING VIRTUAL VIEWPOINT 3 |
| 95 | SELECTED VIRTUAL VIEWPOINT |
| 96 | SWITCHING VIRTUAL VIEWPOINT 4 |
| 97 | SELECTED VIRTUAL VIEWPOINT |
| 98 | SWITCHING VIRTUAL VIEWPOINT 1 |
| 99 | SELECTED VIRTUAL VIEWPOINT |
| 100 | SWITCHING VIRTUAL VIEWPOINT 2 |

FIG. 13F

| FRAME NUMBER | VIRTUAL VIEWPOINT |
|---|---|
| 101 | SELECTED VIRTUAL VIEWPOINT |
| 102 | SWITCHING VIRTUAL VIEWPOINT 3 |
| 103 | SELECTED VIRTUAL VIEWPOINT |
| 104 | SWITCHING VIRTUAL VIEWPOINT 4 |
| 105 | SELECTED VIRTUAL VIEWPOINT |
| 106 | SWITCHING VIRTUAL VIEWPOINT 1 |
| 107 | SELECTED VIRTUAL VIEWPOINT |
| 108 | SWITCHING VIRTUAL VIEWPOINT 2 |
| 109 | SELECTED VIRTUAL VIEWPOINT |
| 110 | SWITCHING VIRTUAL VIEWPOINT 3 |
| 111 | SELECTED VIRTUAL VIEWPOINT |
| 112 | SWITCHING VIRTUAL VIEWPOINT 4 |
| 113 | SELECTED VIRTUAL VIEWPOINT |
| 114 | SWITCHING VIRTUAL VIEWPOINT 1 |
| 115 | SELECTED VIRTUAL VIEWPOINT |
| 116 | SWITCHING VIRTUAL VIEWPOINT 2 |
| 117 | SELECTED VIRTUAL VIEWPOINT |
| 118 | SWITCHING VIRTUAL VIEWPOINT 3 |
| 119 | SELECTED VIRTUAL VIEWPOINT |
| 120 | SWITCHING VIRTUAL VIEWPOINT 4 |

| VIEWPOINT TYPE | POSITION, DIRECTION, ANGLE OF VIEW |
|---|---|
| SWITCHING VIRTUAL VIEWPOINT 1 | (-20, 40, 15), (90, -20, 0), 30 |
| SWITCHING VIRTUAL VIEWPOINT 2 | (40, 20, 2), (40, 0, 0), 45 |
| SWITCHING VIRTUAL VIEWPOINT 3 | (-10, 50, 15), (-90, -20, 0), 30 |
| SWITCHING VIRTUAL VIEWPOINT 4 | (30, 0, 0), (-180, -10, 5), 60 |

1402

| VIEWPOINT TYPE | POSITION, DIRECTION, ANGLE OF VIEW |
|---|---|
| SWITCHING VIRTUAL VIEWPOINT 1 | (-15, 0, 15), (0, -20, 0), 45 |
| SWITCHING VIRTUAL VIEWPOINT 2 | (50, 0, 10), (-10, -10, 5), 45 |
| SWITCHING VIRTUAL VIEWPOINT 3 | (10, 50, 5), (-140, -5, 0), 40 |

1403

| VIEWPOINT TYPE | POSITION, DIRECTION, ANGLE OF VIEW |
|---|---|
| SWITCHING VIRTUAL VIEWPOINT 1 | (-10, 50, 15), (-90, -20, 0), 30 |
| SWITCHING VIRTUAL VIEWPOINT 2 | (-40, 20, 2), (-40, 0, 0), 45 |
| SWITCHING VIRTUAL VIEWPOINT 3 | (10, 10, 5), (-140, -5, 0), 40 |
| SWITCHING VIRTUAL VIEWPOINT 4 | (-15, 0, 15), (0, -20, 0), 45 |
| SWITCHING VIRTUAL VIEWPOINT 5 | (0, 0, 20), (0, 0, 0), 45 |

FIG. 14B

| VIEWPOINT TYPE | VIEWPOINT ID | POSITION, DIRECTION, ANGLE OF VIEW |
|---|---|---|
| SELECTED VIRTUAL VIEWPOINT | 408 | (-20, -10, 5), (10, -10, 0), 55 |
| SWITCHING VIRTUAL VIEWPOINT 1 | 413 | (-20, 40, 15), (90, -20, 0), 30 |
| SWITCHING VIRTUAL VIEWPOINT 2 | 414 | (40, 20, 2), (40, 0, 0), 45 |
| SWITCHING VIRTUAL VIEWPOINT 3 | 415 | (-10, 50, 15), (-90, -20, 0), 30 |
| SWITCHING VIRTUAL VIEWPOINT 4 | 416 | (30, 0, 0), (-180, -10, 5), 60 |

DISPLAY CONTROL APPARATUS, DISPLAY CONTROL METHOD, AND NON-TRANSITORY COMPUTER-READABLE STORAGE MEDIUM

CROSS-REFERENCE TO RELATED APPLICATIONS

This application is a Continuation of International Patent Application No. PCT/JP2018/042948, filed Nov. 21, 2018, which claims the benefit of Japanese Patent Application No. 2017-245392, filed Dec. 21, 2017, both of which are hereby incorporated by reference herein in their entirety.

BACKGROUND OF THE INVENTION

Field of the Invention

The present invention relates to a technique of displaying a virtual viewpoint image based on captured images.

Background Art

In recent years, a technique of performing synchronous image capturing at multi-viewpoints using a plurality of cameras placed at different positions and generating not only images from camera installation positions but also an image (virtual viewpoint image) from an arbitrary viewpoint (virtual viewpoint) using a plurality of images (a plurality of viewpoint images) obtained by the image capturing has received attention.

Generation and viewing of the virtual viewpoint image based on the plurality of viewpoint images can be implemented by the following processing. That is, images captured by the plurality of cameras are collected in an image processing unit such as a server, the image processing unit executes processing such as rendering based on the virtual viewpoint to generate a virtual viewpoint image, and then the virtual viewpoint image is displayed on a user terminal.

A service using a virtual viewpoint image allows a video producer to produce a powerful viewpoint content from, for example, a video obtained by capturing a soccer game or a basketball game. In addition, the service also allows a user who is viewing the content to watch the game by freely moving his/her viewpoint, thereby providing high realism to the user. PTL 1 discloses a technique of selecting one of a plurality of virtual viewpoints by the user.

According to the invention described in PTL 1, the user can select one of a plurality of prepared virtual viewpoints to display a virtual viewpoint image at the selected virtual viewpoint. In addition, since the rough positions of the virtual viewpoints are displayed by character strings, the virtual viewpoints can be discriminated. However, for example, if the operator of the virtual viewpoints uses in live broadcasting of a sport, he/she cannot know, before switching of the virtual viewpoint, what will be shown in a virtual viewpoint image after switching. Therefore, it may be impossible to appropriately select the virtual viewpoint in accordance with a performance. The present invention provides a technique for allowing the user to select an appropriate virtual viewpoint.

CITATION LIST

Patent Literature

PTL 1: Japanese Patent Laid-Open No. 2014-215828

SUMMARY OF THE INVENTION

According to the first aspect of the present invention, there is provided a display control apparatus comprising: an acquisition unit configured to acquire a plurality of virtual viewpoint images corresponding to positions and directions of a plurality of virtual viewpoints; and a display control unit configured to display the plurality of virtual viewpoint images acquired by the acquisition unit on an operation screen for an operation associated with the position and direction of the virtual viewpoint, wherein the virtual viewpoint image corresponding to the virtual viewpoint selected as a position and direction operation target among the plurality of virtual viewpoints is generated based on a plurality of captured images obtained by capturing an image capturing target region by a plurality of cameras, and is transmitted to another apparatus.

According to the second aspect of the present invention, there is provided a display control apparatus comprising: an acquisition unit configured to acquire a plurality of virtual viewpoint images corresponding to positions and directions of a plurality of virtual viewpoints; and a display control unit configured to display the plurality of virtual viewpoint images acquired by the acquisition unit on an operation screen for an operation associated with the position and direction of the virtual viewpoint, wherein at least one of the plurality of virtual viewpoint images displayed on the operation screen by the display control unit is an image generated based on a plurality of captured images obtained by capturing an image capturing target region by a plurality of cameras, and in response to a user operation for adding a virtual viewpoint, the display control unit newly displays a virtual viewpoint image corresponding to a position and direction of the virtual viewpoint on the operation screen.

According to the third aspect of the present invention, there is provided a display control apparatus comprising: an acquisition unit configured to acquire a plurality of virtual viewpoint images corresponding to positions and directions of a plurality of virtual viewpoints; and a display control unit configured to display the plurality of virtual viewpoint images acquired by the acquisition unit on an operation screen for an operation associated with the position and direction of the virtual viewpoint, wherein at least one of the plurality of virtual viewpoint images displayed on the operation screen by the display control unit is an image generated based on a plurality of captured images obtained by capturing an image capturing target region by a plurality of cameras, and in response to a predetermined user operation, the display control unit switches from a state in which a plurality of first virtual viewpoint images corresponding to a plurality of first virtual viewpoints are displayed on the operation screen to a state in which a plurality of second virtual viewpoint images corresponding to a plurality of second virtual viewpoints are displayed on the operation screen.

According to the fourth aspect of the present invention, there is provided a display control apparatus comprising: an acquisition unit configured to acquire a plurality of virtual viewpoint images corresponding to positions and directions of a plurality of virtual viewpoints; and a display control unit configured to display the plurality of virtual viewpoint images acquired by the acquisition unit on an operation screen for an operation associated with the position and direction of the virtual viewpoint, wherein at least one of the plurality of virtual viewpoint images displayed on the operation screen by the display control unit is an image generated based on a plurality of captured images obtained by capturing an image capturing target region by a plurality of cameras, and in response to a user operation for deleting a virtual viewpoint, the display control unit controls not to display, on the operation screen, a virtual viewpoint image corresponding to a position and direction of the virtual viewpoint.

According to the fifth aspect of the present invention, there is provided a display control apparatus comprising: an acquisition unit configured to acquire a plurality of virtual viewpoint images corresponding to positions and directions of a plurality of virtual viewpoints; and a display control unit configured to display the plurality of virtual viewpoint images acquired by the acquisition unit on an operation screen for an operation associated with the position and direction of the virtual viewpoint, wherein at least one of the plurality of virtual viewpoint images displayed on the operation screen by the display control unit is an image generated based on a plurality of captured images obtained by capturing an image capturing target region by a plurality of cameras, and in response to a user operation for rearranging virtual viewpoint images, the display control unit changes a display order of at least some of the plurality of virtual viewpoint images displayed on the operation screen.

According to the sixth aspect of the present invention, there is provided a display control method for a display control apparatus, comprising: acquiring a plurality of virtual viewpoint images corresponding to positions and directions of a plurality of virtual viewpoints; and displaying the plurality of virtual viewpoint images acquired in the acquisition on an operation screen for an operation associated with the position and direction of the virtual viewpoint, wherein the virtual viewpoint image corresponding to the virtual viewpoint selected as a position and direction operation target among the plurality of virtual viewpoints is generated based on a plurality of captured images obtained by capturing an image capturing target region by a plurality of cameras, and is transmitted to another apparatus.

According to the seventh aspect of the present invention, there is provided a display control method for a display control apparatus, comprising: acquiring a plurality of virtual viewpoint images corresponding to positions and directions of a plurality of virtual viewpoints; and displaying the plurality of virtual viewpoint images acquired in the acquisition on an operation screen for an operation associated with the position and direction of the virtual viewpoint, wherein at least one of the plurality of virtual viewpoint images displayed on the operation screen is an image generated based on a plurality of captured images obtained by capturing an image capturing target region by a plurality of cameras, and in response to a user operation for adding a virtual viewpoint, a virtual viewpoint image corresponding to a position and direction of the virtual viewpoint is newly displayed on the operation screen.

According to the eighth aspect of the present invention, there is provided a display control method for a display control apparatus, comprising: acquiring a plurality of virtual viewpoint images corresponding to positions and directions of a plurality of virtual viewpoints; and displaying the plurality of virtual viewpoint images acquired in the acquisition on an operation screen for an operation associated with the position and direction of the virtual viewpoint, wherein at least one of the plurality of virtual viewpoint images displayed on the operation screen is an image generated based on a plurality of captured images obtained by capturing an image capturing target region by a plurality of cameras, and in response to a predetermined user operation, a state in which a plurality of first virtual viewpoint images corresponding to a plurality of first virtual viewpoints are displayed on the operation screen is switched to a state in which a plurality of second virtual viewpoint images corresponding to a plurality of second virtual viewpoints are displayed on the operation screen.

According to the ninth aspect of the present invention, there is provided a display control method for a display control apparatus, comprising: acquiring a plurality of virtual viewpoint images corresponding to positions and directions of a plurality of virtual viewpoints; and displaying the plurality of virtual viewpoint images acquired in the acquisition on an operation screen for an operation associated with the position and direction of the virtual viewpoint, wherein at least one of the plurality of virtual viewpoint images displayed on the operation screen is an image generated based on a plurality of captured images obtained by capturing an image capturing target region by a plurality of cameras, and in response to a user operation for deleting a virtual viewpoint, it is controlled not to display, on the operation screen, a virtual viewpoint image corresponding to a position and direction of the virtual viewpoint as a deletion target.

According to the tenth aspect of the present invention, there is provided a display control method for a display control apparatus, comprising: acquiring a plurality of virtual viewpoint images corresponding to positions and directions of a plurality of virtual viewpoints; and displaying the plurality of virtual viewpoint images acquired in the acquisition on an operation screen for an operation associated with the position and direction of the virtual viewpoint, wherein at least one of the plurality of virtual viewpoint images displayed on the operation screen is an image generated based on a plurality of captured images obtained by capturing an image capturing target region by a plurality of cameras, and in response to a user operation for rearranging virtual viewpoint images, a display order of at least some of the plurality of virtual viewpoint images displayed on the operation screen is changed.

According to the eleventh aspect of the present invention, there is provided a non-transitory computer-readable storage medium for storing a computer program for causing a computer to function as: an acquisition unit configured to acquire a plurality of virtual viewpoint images corresponding to positions and directions of a plurality of virtual viewpoints; and a display control unit configured to display the plurality of virtual viewpoint images acquired by the acquisition unit on an operation screen for an operation associated with the position and direction of the virtual viewpoint, wherein the virtual viewpoint image corresponding to the virtual viewpoint selected as a position and direction operation target among the plurality of virtual viewpoints is generated based on a plurality of captured images obtained by capturing an image capturing target region by a plurality of cameras, and is transmitted to another apparatus.

According to the twelfth aspect of the present invention, there is provided a non-transitory computer-readable storage medium for storing a computer program for causing a computer to function as: an acquisition unit configured to acquire a plurality of virtual viewpoint images corresponding to positions and directions of a plurality of virtual viewpoints; and a display control unit configured to display the plurality of virtual viewpoint images acquired by the acquisition unit on an operation screen for an operation associated with the position and direction of the virtual viewpoint, wherein at least one of the plurality of virtual viewpoint images displayed on the operation screen by the display control unit is an image generated based on a plurality of captured images obtained by capturing an image capturing target region by a plurality of cameras, and in response to a user operation for adding a virtual viewpoint, the display control unit newly displays a virtual viewpoint image corresponding to a position and direction of the virtual viewpoint on the operation screen.

According to the thirteenth aspect of the present invention, there is provided a non-transitory computer-readable storage medium for storing a computer program for causing a computer to function as: an acquisition unit configured to acquire a plurality of virtual viewpoint images corresponding to positions and directions of a plurality of virtual viewpoints; and a display control unit configured to display the plurality of virtual viewpoint images acquired by the acquisition unit on an operation screen for an operation associated with the position and direction of the virtual viewpoint, wherein at least one of the plurality of virtual viewpoint images displayed on the operation screen by the display control unit is an image generated based on a plurality of captured images obtained by capturing an image capturing target region by a plurality of cameras, and in response to a predetermined user operation, the display control unit switches from a state in which a plurality of first virtual viewpoint images corresponding to a plurality of first virtual viewpoints are displayed on the operation screen to a state in which a plurality of second virtual viewpoint images corresponding to a plurality of second virtual viewpoints are displayed on the operation screen.

According to the fourteenth aspect of the present invention, there is provided a non-transitory computer-readable storage medium for storing a computer program for causing a computer to function as: an acquisition unit configured to acquire a plurality of virtual viewpoint images corresponding to positions and directions of a plurality of virtual viewpoints; and a display control unit configured to display the plurality of virtual viewpoint images acquired by the acquisition unit on an operation screen for an operation associated with the position and direction of the virtual viewpoint, wherein at least one of the plurality of virtual viewpoint images displayed on the operation screen by the display control unit is an image generated based on a plurality of captured images obtained by capturing an image capturing target region by a plurality of cameras, and in response to a user operation for deleting a virtual viewpoint, the display control unit controls not to display, on the operation screen, a virtual viewpoint image corresponding to a position and direction of the virtual viewpoint.

According to the fifteenth aspect of the present invention, there is provided a non-transitory computer-readable storage medium for storing a computer program for causing a computer to function as: an acquisition unit configured to acquire a plurality of virtual viewpoint images corresponding to positions and directions of a plurality of virtual viewpoints; and a display control unit configured to display the plurality of virtual viewpoint images acquired by the acquisition unit on an operation screen for an operation associated with the position and direction of the virtual viewpoint, wherein at least one of the plurality of virtual viewpoint images displayed on the operation screen by the display control unit is an image generated based on a plurality of captured images obtained by capturing an image capturing target region by a plurality of cameras, and in response to a user operation for rearranging virtual viewpoint images, the display control unit changes a display order of at least some of the plurality of virtual viewpoint images displayed on the operation screen.

Further features of the present invention will become apparent from the following description of exemplary embodiments with reference to the attached drawings.

BRIEF DESCRIPTION OF THE DRAWINGS

FIG. 13A is a table for explaining the fourth embodiment.
FIG. 13B is a table for explaining the fourth embodiment.
FIG. 13C is a table for explaining the fourth embodiment.
FIG. 13D is a table for explaining the fourth embodiment.
FIG. 13E is a table for explaining the fourth embodiment.
FIG. 13F is a table for explaining the fourth embodiment.
FIG. 14A is a view showing examples of a virtual viewpoint set.
FIG. 14B is a table showing an example of the structure of table information.

DESCRIPTION OF THE EMBODIMENTS

Embodiments will be described below with reference to the accompanying drawings. Note that the embodiments to be described below are examples of detailed implementation of the present invention or detailed examples of the arrangement described in the appended claims.

First Embodiment

Figure 1:
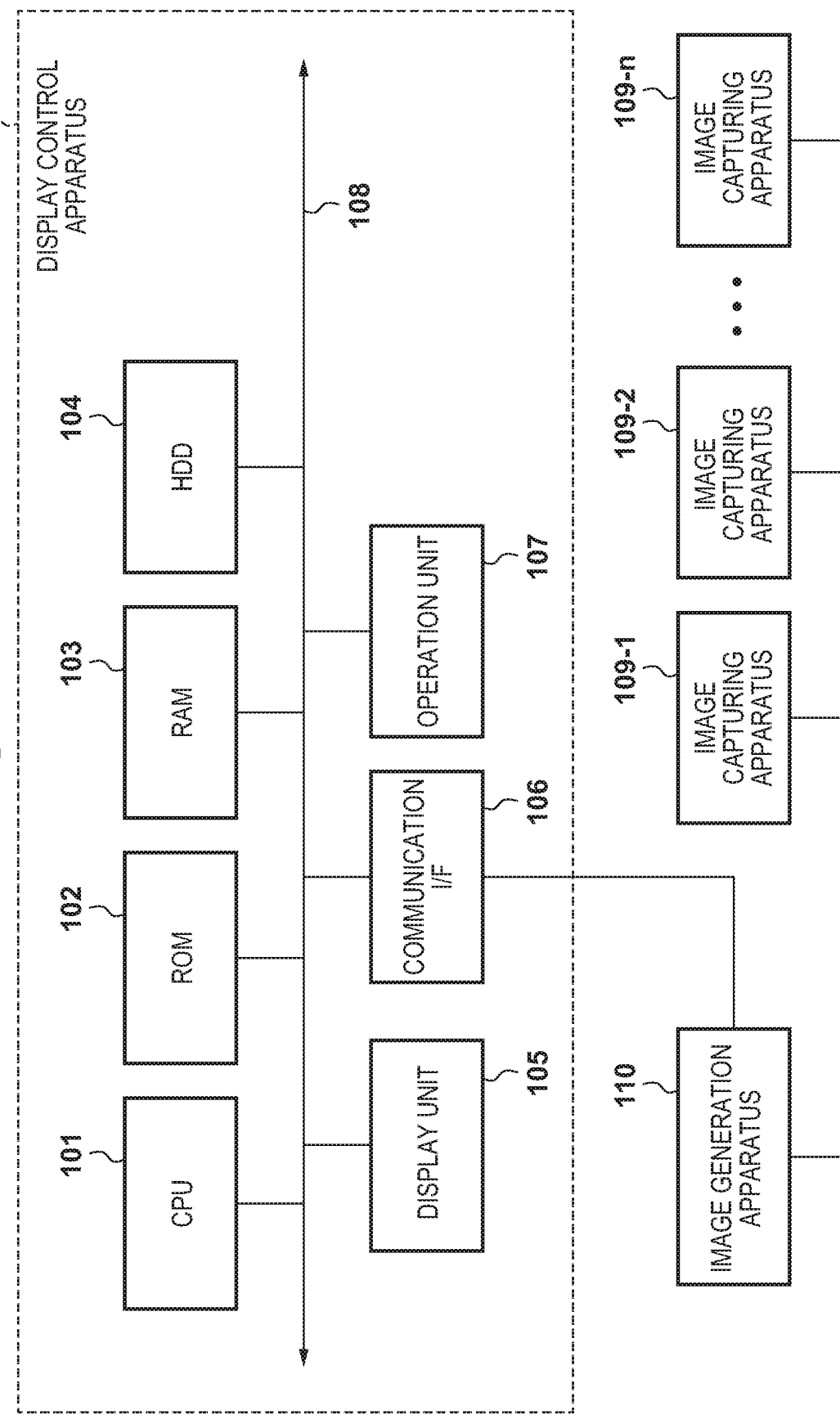
FIG. 1 is a block diagram showing an example of the arrangement of a system.

An example of the arrangement of a system according to this embodiment will be described with reference to a block diagram shown in FIG. 1. As shown in FIG. 1, the system according to this embodiment includes a display control apparatus 100, an image generation apparatus 110, and image capturing apparatuses 109-1 to 109-*n* (n is an integer of 2 or more).

First, the image capturing apparatuses 109-1 to 109-*n* will be described. The image capturing apparatuses 109-1 to 109-*n* are provided to capture videos of an object from a plurality of different directions. Each of the image capturing apparatuses 109-1 to 109-n outputs an image (captured image) of each frame forming the captured video to the image generation apparatus 110. A connection mode between the image capturing apparatuses 109-1 to 109-n and the image generation apparatus 110 is not limited to a specific one. That is, the connection mode between the image capturing apparatuses 109-1 to 109-n and the image generation apparatus 110 may be a daisy chain or a star network. Furthermore, the connection mode may be a wireless network, a wired network, or a combination thereof.

The display control apparatus 100 will be described next. The display control apparatus 100 requests the image generation apparatus 110 to generate a virtual viewpoint image based on a virtual viewpoint, and performs display control of the virtual viewpoint image generated by the image generation apparatus 110 in accordance with the request. The display control apparatus 100 is formed by a computer apparatus such as a PC (Personal Computer), a smartphone, or a tablet terminal apparatus.

A CPU (Central Processing Unit) 101 executes processing using a computer program and data stored in a ROM (Read-Only Memory) 102 and a RAM (Random Access Memory) 103. Then, the CPU 101 controls the operation of the overall display control apparatus 100 while executing or controlling each process to be described later as that executed by the display control apparatus 100.

The ROM 102 stores a computer program and data which need not be rewritten, such as an activation program and setting data.

The RAM 103 has an area to store a computer program and data loaded from the ROM 102 or an HDD (Hard Disk Drive) 104. Furthermore, the RAM 103 has an area to store the data (for example, the virtual viewpoint image) received from the image generation apparatus 110 via a communication I/F (interface) 106. The RAM 103 has a work area used by the CPU 101 to execute various processes. In this way, the RAM 103 can appropriately provide various areas.

The HDD 104 saves an OS (Operating System), and computer programs and data for causing the CPU 101 to execute or control each process to be described later as that executed by the display control apparatus 100. The data saved in the HDD 104 include those described as known information in the following description. The computer programs and data saved in the HDD 104 are appropriately loaded into the RAM 103 under the control of the CPU 101 and processed by the CPU 101.

A display unit 105 is formed by a CRT, a liquid crystal screen, or the like, and can display a processing result by the CPU 101 using an image or characters. Note that the display unit 105 may be a projection apparatus that projects the processing result by the CPU 101 as an image or characters. The display unit 105 may be a touch panel screen, a head mounted display device such as an HMD (Head Mounted Display), a handheld display device, a smartphone, or a tablet terminal apparatus.

The communication I/F 106 functions as an interface for performing data communication with the image generation apparatus 110. A connection mode between the display control apparatus 100 and the image generation apparatus 110 is not limited to a specific one. For example, the network between the display control apparatus 100 and the image generation apparatus 110 may be a wireless network, a wired network, or a combination thereof.

An operation unit 107 is formed by a user interface such as a keyboard, a mouse, a joystick, a game pad, or a touch panel, and can be operated by the user to input various instructions to the CPU 101.

The CPU 101, the ROM 102, the RAM 103, the HDD 104, the display unit 105, the communication I/F 106, and the operation unit 107 are all connected to a bus 108. Note that the arrangement of the display control apparatus 100 shown in FIG. 1 is merely an example, and any arrangement that can implement processing to be described later as that executed by the display control apparatus 100 may be adopted. For example, a component that reads/writes information from/in an information recording medium such as a flexible disk (FD), a CD-ROM, a DVD, a USB memory, an MO, or a flash memory may be added to the display control apparatus 100. In this case, information described as that held in the HDD 104 may be stored in this information recording medium. A server apparatus connected to the display control apparatus 100 via a network may be used as a medium that records information. As described above, a device that holds information such as computer programs and data processed by the display control apparatus 100 is not limited to a specific one.

The image generation apparatus 110 will be described next. In response to a request from the display control apparatus 100, the image generation apparatus 110 generates, based on images captured by one or more of the image capturing apparatuses 109-1 to 109-n, a virtual viewpoint image based on a virtual viewpoint. The image generation apparatus 110 transmits the generated virtual viewpoint image to the display control apparatus 100. The image generation apparatus 110 is formed by a computer apparatus such as a PC (Personal Computer), a smartphone, or a table terminal apparatus.

Figure 2:
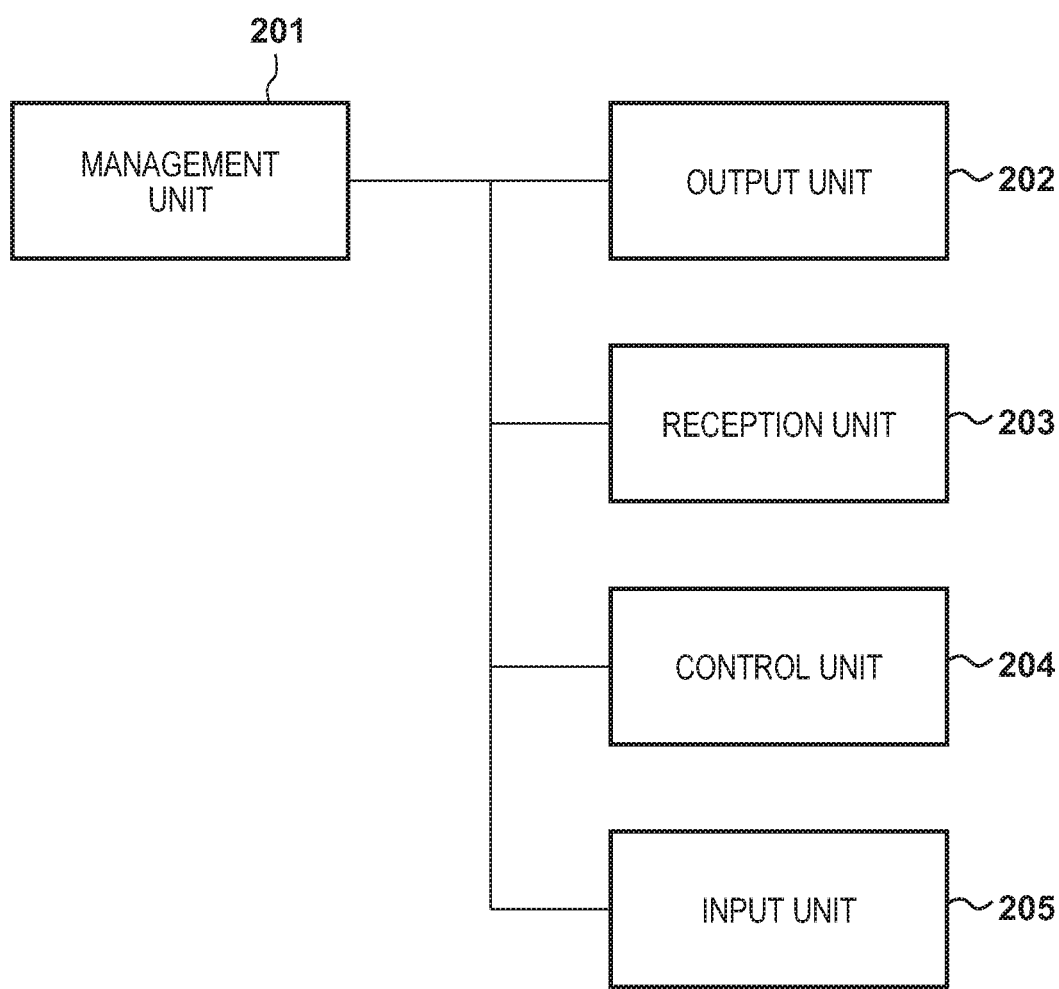
FIG. 2 is a block diagram showing an example of the functional arrangement of a display control apparatus 100.
Figures 5, 6:
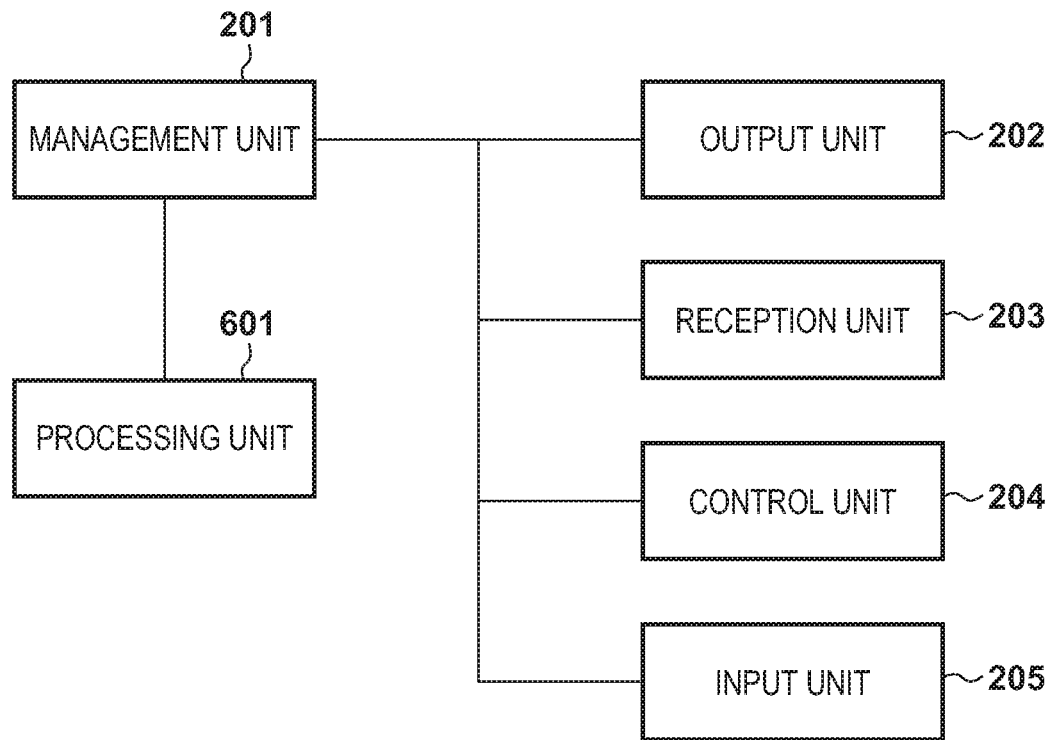
FIG. 5 is a table showing an example of the structure of "information concerning a plurality of virtual viewpoints".
FIG. 6 is a block diagram showing an example of the functional arrangement of a display control apparatus 100.

An example of the functional arrangement of the display control apparatus 100 will be described with reference to a block diagram shown in FIG. 2. A management unit 201 manages information concerning a plurality of virtual viewpoints held in the HDD 104 or the RAM 103. An example of the structure of the "information concerning a plurality of virtual viewpoints" managed by the management unit 201 will be described with reference to FIG. 5. Table information shown in FIG. 5 is an example of the "information concerning a plurality of virtual viewpoints". In the table information shown in FIG. 5, viewpoint information (viewpoint type, viewpoint ID, position, direction, and angle of view) of each of six virtual viewpoints is registered. Note that in FIG. 5, the viewpoint information includes the viewpoint type, viewpoint ID, position, direction, and angle of view. However, pieces of information included in the viewpoint information are not limited to them, and the viewpoint information may include other information such as a focal length in addition to the viewpoint type, viewpoint ID, position, direction, and angle of view. Furthermore, contents of information for defining each virtual viewpoint and a method of managing information for defining each viewpoint are not limited to specific ones.

As shown in FIG. 5, only one of the six virtual viewpoints is a selected virtual viewpoint (viewpoint type) and the remaining five virtual viewpoints are switching virtual viewpoints (viewpoint type). "Selected virtual viewpoint" indicates a virtual viewpoint to be operated by operating the operation unit 107 by the user, and "switching virtual viewpoint" indicates a virtual viewpoint as a candidate to be selected as a selected virtual viewpoint by operating the operation unit 107 by the user. Referring to FIG. 5, a virtual viewpoint corresponding to a viewpoint ID=408 is a selected virtual viewpoint and virtual viewpoints corresponding to viewpoint IDs=409 to 413 are switching virtual viewpoints.

For example, assume that the user performs an operation of selecting (designating) the virtual viewpoint with the viewpoint ID=409 as the selected virtual viewpoint by operating the operation unit 107. In this case, the management unit 201 changes the viewpoint type corresponding to the viewpoint ID=409 to "selected virtual viewpoint", and changes the viewpoint type corresponding to the viewpoint ID=408 to "switching virtual viewpoint". When the user operates the operation unit 107 in this way, an arbitrary one of the six virtual viewpoints registered in the table information shown in FIG. 5 can be selected as the selected virtual viewpoint. To provide a detailed description below, assume that the table information shown in FIG. 5 is registered in the HDD 104 or the RAM 103 and the management unit 201 manages this table information. The initial values of the switching virtual viewpoints may be arbitrarily preset by the user or arbitrary values defined by the system may be used.

The management unit 201 reads out the viewpoint information of each switching virtual viewpoint registered in the table information, and outputs it to an output unit 202. The management unit 201 also reads out the viewpoint information of the selected virtual viewpoint registered in the table information. Then, the management unit 201 generates the second position by copying the position included in the readout viewpoint information, the second direction by copying the direction included in the viewpoint information, and the second angle of view by copying the angle of view included in the viewpoint information. The management unit 201 generates selected viewpoint information including the viewpoint type and the viewpoint ID included in the viewpoint information of the selected virtual viewpoint registered in the table information, the second position, the second direction, and the second angle of view, and outputs the selected viewpoint information to the output unit 202.

The output unit 202 requests the image generation apparatus 110 to generate virtual viewpoint images corresponding to the selected virtual viewpoint and the respective switching virtual viewpoints by outputting, to the image generation apparatus 110 via the communication I/F 106, the pieces of viewpoint information and the selected viewpoint information output from the management unit 201.

A reception unit 203 receives, from the image generation apparatus 110 via the communication I/F 106, the virtual viewpoint images (the virtual viewpoint image corresponding to the selected virtual viewpoint and the virtual viewpoint images corresponding to the switching virtual viewpoints) which have been generated by the image generation apparatus 110 in response to the request by the output unit 202. Note that each virtual viewpoint image output from the image generation apparatus 110 is attached with the viewpoint ID of the virtual viewpoint corresponding to the virtual viewpoint image.

Figure 4A:
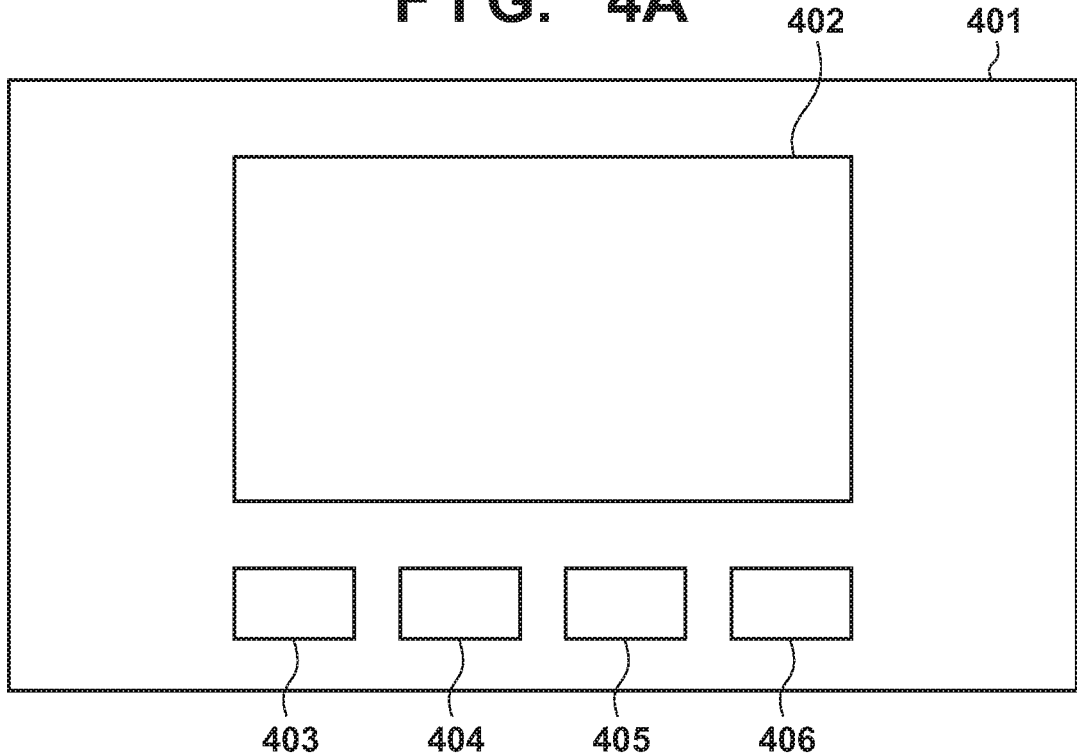
FIG. 4A is a view showing an example of the arrangement of a display screen.

A control unit 204 displays the virtual viewpoint images received by the reception unit 203 on the display screen of the display unit 105 without overlapping each other. For example, as shown in FIG. 4A, the virtual viewpoint image attached with the viewpoint ID corresponding to the selected virtual viewpoint among the virtual viewpoint images received by the reception unit 203 is displayed in a display region 402 in a display region 401 of the display unit 105. Furthermore, the virtual viewpoint images attached with the viewpoint IDs of the switching virtual viewpoints among the virtual viewpoint images received by the reception unit 203 are displayed in display regions 403 to 406 in the display region 401. In the case shown in FIG. 5, the virtual viewpoint image generated by the image generation apparatus 110 for the selected virtual viewpoint with the viewpoint ID=408 is displayed in the display region 402. The virtual viewpoint images generated by the image generation apparatus 110 for the switching virtual viewpoints with the viewpoint IDs=409 to 412 are displayed in the display regions 403 to 406, respectively.

Note that the display region 401 may correspond to the entire region of the display screen of the display unit 105 or a partial region of the display screen of the display unit 105 (for example, a region in a window displayed on the display unit 105).

An input unit 205 implements the operation of the selected virtual viewpoint by the user by performing an operation of changing at least one of the second position, the second direction, and the second angle of view included in the selected viewpoint information in response to an operation (user operation) input by operating the operation unit 107 by the user. That is, even if the user changes the position, direction, or angle of view of the selected virtual viewpoint by operating the operation unit 107, the change is reflected not on the table information but on generation of the virtual viewpoint image corresponding to the selected virtual viewpoint.

Furthermore, if the user performs an operation of selecting the selected virtual viewpoint by operating the operation unit 107, the input unit 205 instructs the management unit 201 to change the selected virtual viewpoint. The processing of changing the selected virtual viewpoint by the management unit 201 is as described above.

Note that a description will be made below by taking each functional unit (management unit 201, output unit 202, reception unit 203, control unit 204, or input unit 205) shown in FIG. 2 as a main unit of processing. However, in fact, the function of each functional unit is implemented when the CPU 101 executes a computer program for causing the CPU 101 to execute the function of the functional unit. The same applies to FIGS. 6 and 10 (to be described later). Note that some or all of the functional components shown in FIG. 2 may be implemented by dedicated hardware. Examples of the dedicated hardware are an ASIC, FPGA, and GPU. In addition, some of the functional components shown in FIG. 2 may be provided in one or a plurality of other apparatuses different from the display control apparatus 100.

In FIG. 1, the image generation apparatus 110 and the display control apparatus 100 are separate apparatuses. However, the image generation apparatus 110 and the display control apparatus 100 may be integrated into one apparatus. In this case, the output unit 202 and the reception unit 203 can be eliminated.

Figure 3:
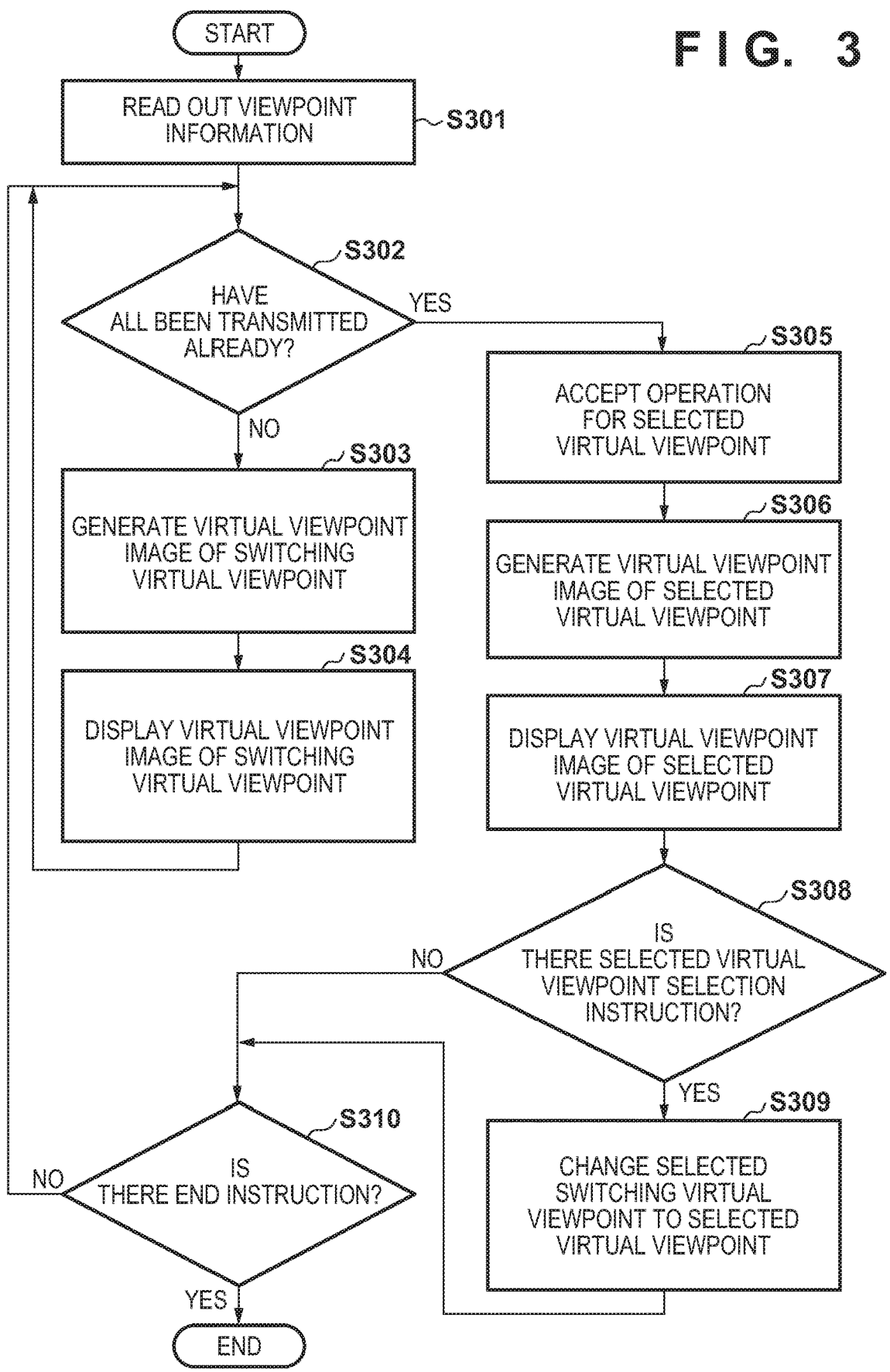
FIG. 3 is a flowchart illustrating processing executed by the system.

Processing executed by the system according to this embodiment will be described next with reference to a flowchart shown in FIG. 3. The processing according to the flowchart shown in FIG. 3 starts in a state in which a virtual viewpoint setting application is activated, and is executed until the virtual viewpoint setting application ends. Processes in steps S302 to S310 shown in FIG. 3 loop once for each frame of a virtual viewpoint image displayed on a virtual viewpoint setting screen (for example, the display region 401 of FIG. 4A). If a virtual viewpoint image is generated at 60 fps (frames/sec), this loop is repeated 60 times per sec.

In step S301, the management unit 201 reads out the viewpoint information of each switching virtual viewpoint registered in the above table information, and generates selected viewpoint information from the viewpoint information of the selected virtual viewpoint registered in the above table information. The management unit 201 outputs each of the pieces of viewpoint information of the respective switching virtual viewpoints and the selected viewpoint information of the selected virtual viewpoint to the output unit 202.

In step S302, the output unit 202 determines whether all the pieces of viewpoint information of the switching virtual viewpoints output from the management unit 201 have been transmitted to the image generation apparatus 110. If, as a result of the determination processing, among the pieces of viewpoint information of the switching virtual viewpoints output from the management unit 201, the viewpoint information which has not been transmitted to the image generation apparatus 110 remains, the process advances to step S303. On the other hand, if, as a result of the determination processing, all the pieces of viewpoint information of the switching virtual viewpoints output from the management unit 201 have been transmitted to the image generation apparatus 110, the process advances to step S305.

In step S303, the output unit 202 outputs, among the pieces of viewpoint information of the switching virtual viewpoints output from the management unit 201, the untransmitted viewpoint information to the image generation apparatus 110 via the communication I/F 106. The image generation apparatus 110 generates a virtual viewpoint image based on the position, direction, and angle of view included in the viewpoint information output from the output unit 202 and images captured by one or more of the image capturing apparatuses 109-1 to 109-n. Then, the image generation apparatus 110 transmits, to the display control apparatus 100, the generated virtual viewpoint image attached with the viewpoint ID included in the viewpoint information.

In step S304, the reception unit 203 receives, via the communication I/F 106, the virtual viewpoint image transmitted from the image generation apparatus 110. Then, the control unit 204 displays the received virtual viewpoint image in the display region (one of the display regions 403 to 406) corresponding to the viewpoint ID attached to the virtual viewpoint image.

In step S305, if the user performs an operation input of changing the position/direction/angle of view of the selected virtual viewpoint by operating the operation unit 107, the input unit 205 changes the second position/second direction/second angle of view included in the selected viewpoint information in accordance with the operation input. If, for example, the user performs an operation input of changing the position of the selected virtual viewpoint by operating the operation unit 107, the input unit 205 changes the second position included in the selected viewpoint information in accordance with this operation input. If the user performs an operation input of changing the direction of the selected virtual viewpoint by operating the operation unit 107, the input unit 205 changes the second direction included in the selected viewpoint information in accordance with this operation input. If the user performs an operation input of changing the angle of view of the selected virtual viewpoint by operating the operation unit 107, the input unit 205 changes the second angle of view included in the selected viewpoint information in accordance with this operation input.

In step S306, the output unit 202 requests the image generation apparatus 110 to generate a virtual viewpoint image corresponding to the selected virtual viewpoint based on the selected viewpoint information by transmitting the selected viewpoint information to the image generation apparatus 110 via the communication I/F 106. In response to this request, the image generation apparatus 110 generates a virtual viewpoint image corresponding to the selected viewpoint information in the same manner as in step S303, and transmits the generated virtual viewpoint image attached with the viewpoint ID included in the selected viewpoint information to the display control apparatus 100.

In step S307, the reception unit 203 receives, via the communication I/F 106, the virtual viewpoint image transmitted from the image generation apparatus 110 in step S306. Then, the control unit 204 displays the received virtual viewpoint image in the display region (display region 402) corresponding to the viewpoint ID attached to the virtual viewpoint image.

In step S308, the input unit 205 determines whether the user has input a selected virtual viewpoint selection instruction by operating the operation unit 107. For example, assume that the user has performed an operation of designating the display region 405 among the display regions 403 to 406 shown in FIG. 4A by operating the operation unit 107. In this case, the input unit 205 determines that an operation instruction has been input to select, as the selected virtual viewpoint, the virtual viewpoint corresponding to the virtual viewpoint image displayed in the display region 405. Note that a selected virtual viewpoint selection operation method is not limited to a specific one.

If, as a result of the determination processing, the selected virtual viewpoint selection instruction has been input, the process advances to step S309; otherwise, the process advances to step S310.

In step S309, the management unit 201 changes, to "selected virtual viewpoint", the viewpoint type managed by the table information for the switching virtual viewpoint corresponding to the virtual viewpoint selected in the display region 401 by operating the operation unit 107 by the user. Then, the management unit 201 changes, to "switching virtual viewpoint", the viewpoint type managed by the table information for the virtual viewpoint image displayed in the display region 402. The management unit 201 generates the second position by copying the position managed by the table information for the virtual viewpoint whose viewpoint type has been changed to "selected virtual viewpoint". The management unit 201 generates the second direction by copying the direction managed by the table information for the virtual viewpoint whose viewpoint type has been changed to "selected virtual viewpoint". The management unit 201 generates the second angle of view by copying the angle of view managed by the table information for the virtual viewpoint whose viewpoint type has been changed to "selected virtual viewpoint". That is, the second position, second direction, and second angle of view always represent the latest position, direction, and angle of view of the current selected virtual viewpoint, respectively. The management unit 201 generates selected viewpoint information including the second position, second direction, and second angle of view updated in step S309, and the viewpoint ID managed by the table information for the virtual viewpoint whose viewpoint type has been changed to "selected virtual viewpoint". Note that the management unit 201 may set the position/direction/angle of view corresponding to the viewpoint ID set as the selected virtual viewpoint to the same values as those of the switching virtual viewpoint specified by a switching instruction.

As described above, the user (the operator of the virtual viewpoint) can operate the position, direction, and angle of view of the virtual viewpoint to obtain a desired virtual viewpoint image by operating the operation unit 107 while seeing the virtual viewpoint image displayed in the display region 402. Furthermore, the user can look for a desired viewpoint to obtain a desired virtual viewpoint image with reference to the display regions 403 to 406. If the virtual viewpoint image of the desired viewpoint is found, the virtual viewpoint image is displayed in the display region 402 by designating selection of the virtual viewpoint image, thereby making it possible to operate the virtual viewpoint. As shown in FIG. 4A, the display regions 402 to 406 are desirably displayed without overlapping each other, and can desirably be browsed at once.

In step S310, the input unit 205 determines whether the user has input an end instruction of the virtual viewpoint setting application by operating the operation unit 107. If, as a result of the determination processing, the end instruction of the virtual viewpoint setting application has been input, the processing according to the flowchart shown in FIG. 3 ends; otherwise, the process returns to step S302.

Figure 4B:
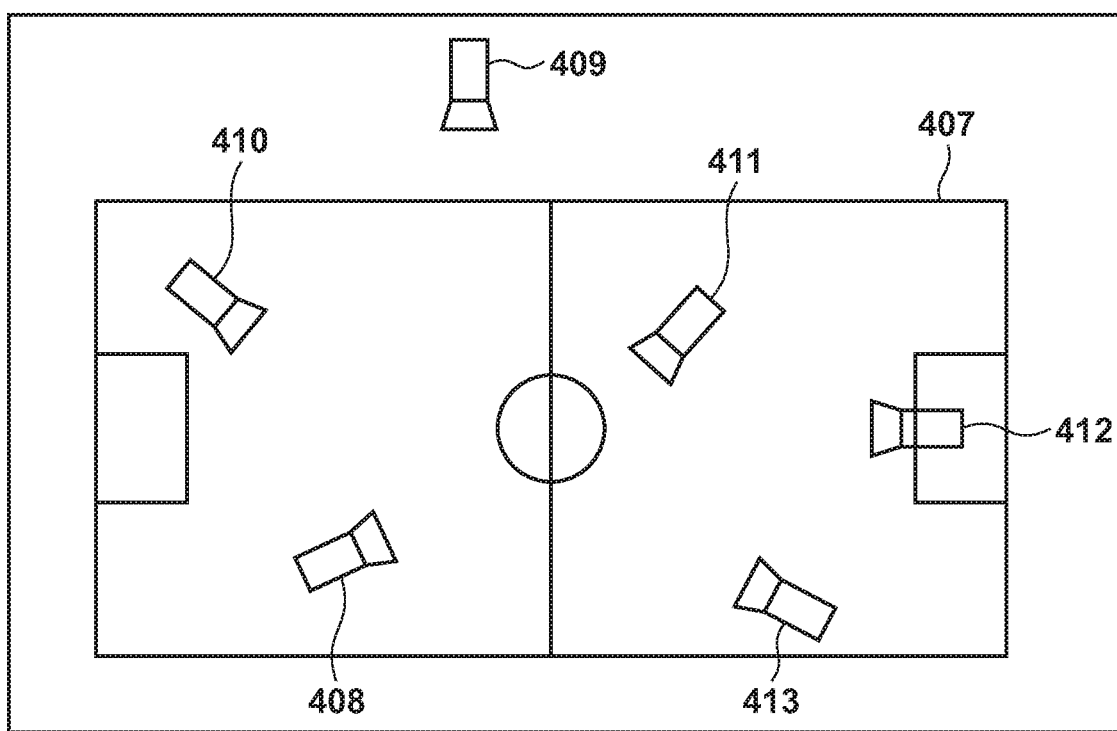
FIG. 4B is a view showing an example of the arrangement of virtual viewpoints.

FIG. 4B shows an example of the arrangement of virtual viewpoints. As shown in FIG. 4B, virtual viewpoints 408 to 413 are set so as to observe a soccer field 407 at various positions in the field 407 from various directions, and the positions, directions, and angles of view of the virtual viewpoints are managed, as shown in FIG. 5. Assume, for example, that the position of each virtual viewpoint is represented by a three-dimensional position in a coordinate system defined for the field 407, the direction of each virtual viewpoint is represented by pan, tilt, and roll values, and the angle of view of each virtual viewpoint is represented by the value of the horizontal angle of view of the virtual viewpoint. The display control apparatus 100 may display the screen shown in FIG. 4B together with the screen shown in FIG. 4A. The display control apparatus 100 displays an icon indicating the position of each virtual viewpoint (in the example shown in FIG. 4B, an icon indicating a camera) in a bird's eye view of the field 407 to be captured. The display control apparatus 100 may distinguish and display the position of the selected virtual viewpoint and the positions of the switching virtual viewpoints to be identifiable. For example, the display control apparatus 100 may display the position of the selected virtual viewpoint and the positions of the switching virtual viewpoints using different colors or icons. Alternatively, the display control apparatus 100 may display the icon indicating the position of each virtual viewpoint in association with the corresponding viewpoint ID. It is possible to readily grasp the positional relationship between the selected virtual viewpoint and the switching virtual viewpoints by displaying the arrangement of the virtual viewpoints shown in FIG. 4B, and it is thus possible to look for a desired viewpoint to obtain a desired virtual viewpoint image.

Note that in the table information shown in FIG. 5, the viewpoint type corresponding to the viewpoint ID=413 is "switching virtual viewpoint (non-display)", and is not a display target. The control unit 204 does not display a virtual viewpoint image corresponding to this viewpoint type. A virtual viewpoint image corresponding to this viewpoint type may not be generated.

As described above, according to this embodiment, a virtual viewpoint image corresponding to each switching virtual viewpoint is displayed as reference information to be referred to in order to select the switching virtual viewpoint as the selected virtual viewpoint next. Therefore, for example, it is possible to grasp a virtual viewpoint to be selected next more intuitively than displaying, as reference information, an image captured by each image capturing apparatus.

Note that the virtual viewpoint image (virtual viewpoint image corresponding to the selected virtual viewpoint) displayed in the display region 402 may be, for example, saved in the HDD 104 of the display control apparatus 100 or transmitted to an external apparatus via the communication I/F 106. In the latter case, for example, the virtual viewpoint image (virtual viewpoint image corresponding to the selected virtual viewpoint) displayed in the display region 402 may be broadcast for broadcasting via the communication I/F 106.

Modification

Since the operator of the virtual viewpoint need only be able to grasp the status of a target captured by the image capturing apparatus, for example, a simple virtual viewpoint image may be generated as a virtual viewpoint image. As the simple virtual viewpoint image, 3D CG (three-dimensional computer graphic) is used. First, the reception unit 203 acquires the positions of foregrounds (for example, players and a ball) in the captured image from the image generation apparatus 110. In the process of generating the virtual viewpoint image, processing of separating the foregrounds and backgrounds is normally performed. The positions of the foregrounds are generally obtained in the process. Therefore, the display control apparatus 100 can readily acquire the positions of the foregrounds from the image generation apparatus 110. Next, the display control apparatus 100 arranges the prepared 3D CG models of the players and ball at the positions acquired from the image generation apparatus 110. Assume that the 3D CG models of the field and stand of a stadium as backgrounds are additionally prepared. If these 3D models are input to a 3D CG rendering engine of the display control apparatus 100, it is possible to generate a simple virtual viewpoint image seen from the virtual viewpoint. Although it cannot be denied that this simple virtual viewpoint image is inferior to the normal virtual viewpoint image in terms of the expression capability, the operator can, for example, grasp the status of a performance and reduce the computer resource. In addition, for example, the virtual viewpoint image displayed in the display region 402 and the virtual viewpoint images corresponding to the switching virtual viewpoints displayed in the display regions 403 to 406 may be displayed at different frame rates.

As described above, according to this embodiment, the screen is displayed, in which the virtual viewpoint image corresponding to the selected virtual viewpoint selected by the user as an operation target among the plurality of virtual viewpoints and the virtual viewpoint images corresponding to the virtual viewpoints other than the selected virtual viewpoint among the plurality of virtual viewpoints are arranged without overlapping each other. This allows the operator to know, before switching to a given virtual viewpoint, what will be shown in a virtual viewpoint image after switching, thus appropriately selecting the virtual viewpoint.

Second Embodiment

In the following embodiments and modifications, differences from the first embodiment will be described, and the remaining is assumed to be the same as in the first embodiment unless it is specifically stated otherwise. In the first embodiment, one of the displayed virtual viewpoint images is designated to select, as the selected virtual viewpoint, the virtual viewpoint corresponding to the one designated virtual viewpoint image. However, a method of selecting the selected virtual viewpoint is not limited to the selection method described in the first embodiment. In this embodiment, a selection method different from that in the first embodiment will be described as the method of selecting the selected virtual viewpoint.

An example of the functional arrangement of a display control apparatus 100 according to this embodiment will be described with reference to a block diagram shown in FIG. 6. In FIG. 6, the same reference numerals as those in FIG. 2 denote the similar functional units, and a description thereof will be omitted. A processing unit 601 assigns a switching virtual viewpoint (in the case shown in FIG. 4A, a switching virtual viewpoint corresponding to each of display regions 403 to 406) to one of a plurality of selection buttons of an operation unit 107.

Then, an input unit 205 determines that the switching virtual viewpoint corresponding to the selection button pressed by the user has been selected as a selected virtual viewpoint. A management unit 201 changes the current selected virtual viewpoint in table information to a switching virtual viewpoint, and changes the switching virtual viewpoint corresponding to the selection button pressed by the user to a selected virtual viewpoint.

Figure 7:
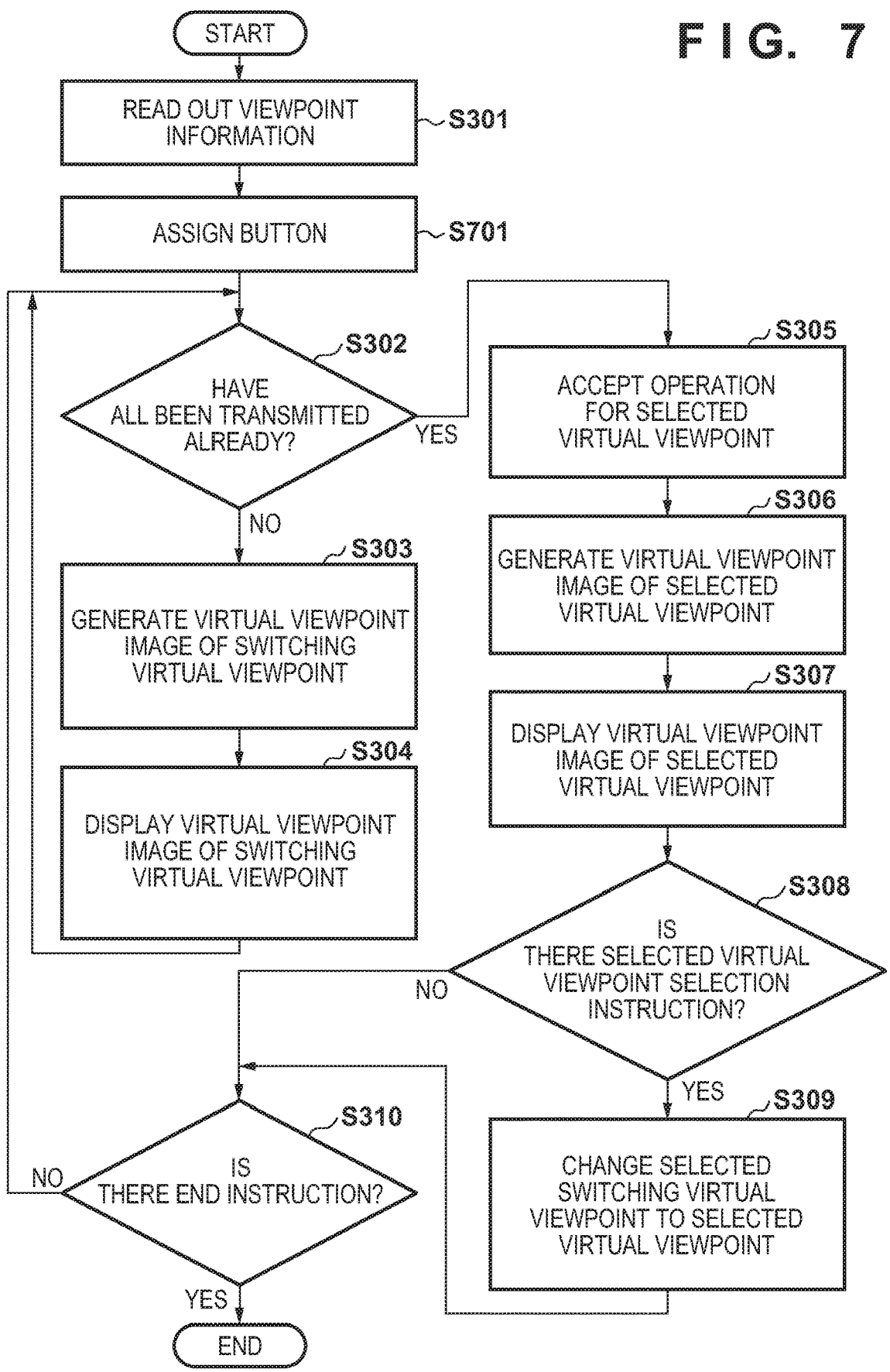
FIG. 7 is a flowchart illustrating processing executed by a system.

Processing executed by a system according to this embodiment will be described with reference to a flowchart shown in FIG. 7. The processing according to the flowchart shown in FIG. 7 starts in a state in which a virtual viewpoint setting application is activated, and is executed until the virtual viewpoint setting application ends. In FIG. 7, the same step numbers as those in FIG. 3 denote the same processing steps and a description thereof will be omitted.

In step S701, the processing unit 601 assigns the switching virtual viewpoint (in the case shown in FIG. 4A, the switching virtual viewpoint corresponding to each of the display regions 403 to 406) to one of the plurality of selection buttons of the operation unit 107.

Figure 8:
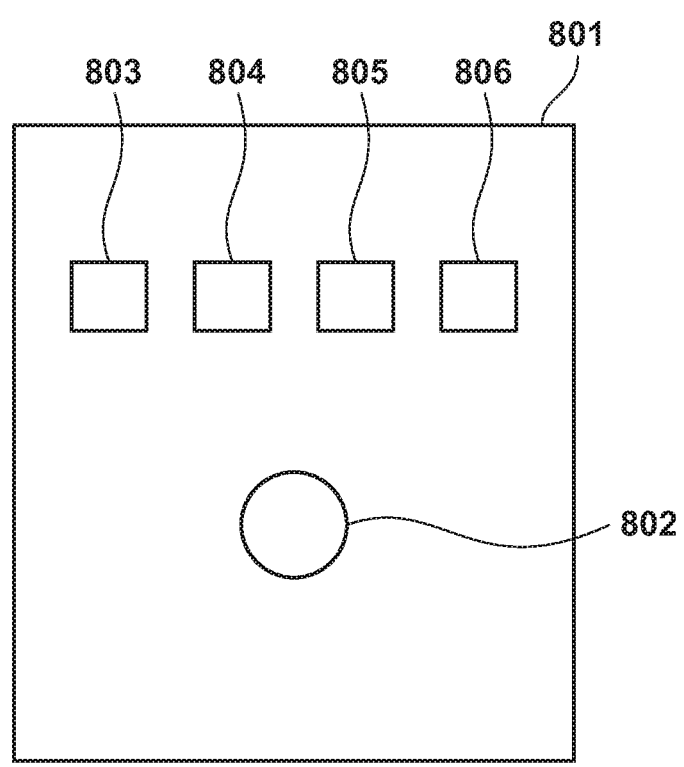
FIG. 8 is a view showing an example of an input device.

FIG. 8 shows an example of an input device applicable as the operation unit 107. An input device 801 shown in FIG. 8 is provided with selection buttons 803 to 806. The processing unit 601 assigns, for example, the display regions 403 to 406 (that is, the switching virtual viewpoints corresponding to the display regions 403 to 406) to the selection buttons 803 to 806, respectively. With this arrangement, if the user presses the selection button 803, the input unit 205 can determine that the virtual viewpoint image in the display region 403 has been selected (the virtual viewpoint corresponding to the virtual viewpoint image has been selected). If the user presses the selection button 804, the input unit 205 can determine that the virtual viewpoint image in the display region 404 has been selected (the virtual viewpoint corresponding to the virtual viewpoint image has been selected). If the user presses the selection button 805, the input unit 205 can determine that the virtual viewpoint image in the display region 405 has been selected (the virtual viewpoint corresponding to the virtual viewpoint image has been selected). If the user presses the selection button 806, the input unit 205 can determine that the virtual viewpoint image in the display region 406 has been selected (the virtual viewpoint corresponding to the virtual viewpoint image has been selected).

If, as described above, the display regions and the selection buttons are horizontally arranged, the display regions are assigned to the selection buttons in the arrangement order, for example, the display region at the left end is assigned to the selection button at the left end, the second display region from the left end is assigned to the second selection button from the left end, . . . . If the display regions and the selection buttons are vertically arranged, the display regions are assigned to the selection buttons in the arrange-ment order, for example, the display region at the upper end is assigned to the selection button at the upper end, the second display region from the upper end is assigned to the second selection button from the upper end, . . . . Note that a method of assigning a specific display region to a specific selection button is not limited to a specific one.

Note that if the number of switching virtual viewpoints is larger than that of selection buttons on the input device, for example, the switching virtual viewpoints are assigned from left as many as possible. As a method of managing assignment of a specific switching virtual viewpoint to a specific selection button, for example, in the table information, the viewpoint information of each switching virtual viewpoint may include the identification information of the selection button assigned to the switching virtual viewpoint. The management method is not limited to a specific one.

In step S308, the input unit 205 determines that the switching virtual viewpoint corresponding to the selection button pressed by the user has been selected as the selected virtual viewpoint (a selection instruction has been input).

The input device 801 is provided with a joystick 802 operated by the user to move the selected virtual viewpoint. The user can move the position and direction of the viewpoint by operating the joystick 802. Among the second position, second direction, and second angle of view included in the selected viewpoint information, the component corresponding to an operation input is changed by operating the joystick 802 by the user.

As described above, according to this embodiment, assignment of the switching virtual viewpoints to the selection buttons on the input device allows the operator of the virtual viewpoint to select the virtual viewpoint on the input device used to perform the operation of the virtual viewpoint without moving the hand to the mouse or the screen. This can select the virtual viewpoint quickly.

Third Embodiment

Figure 9A:
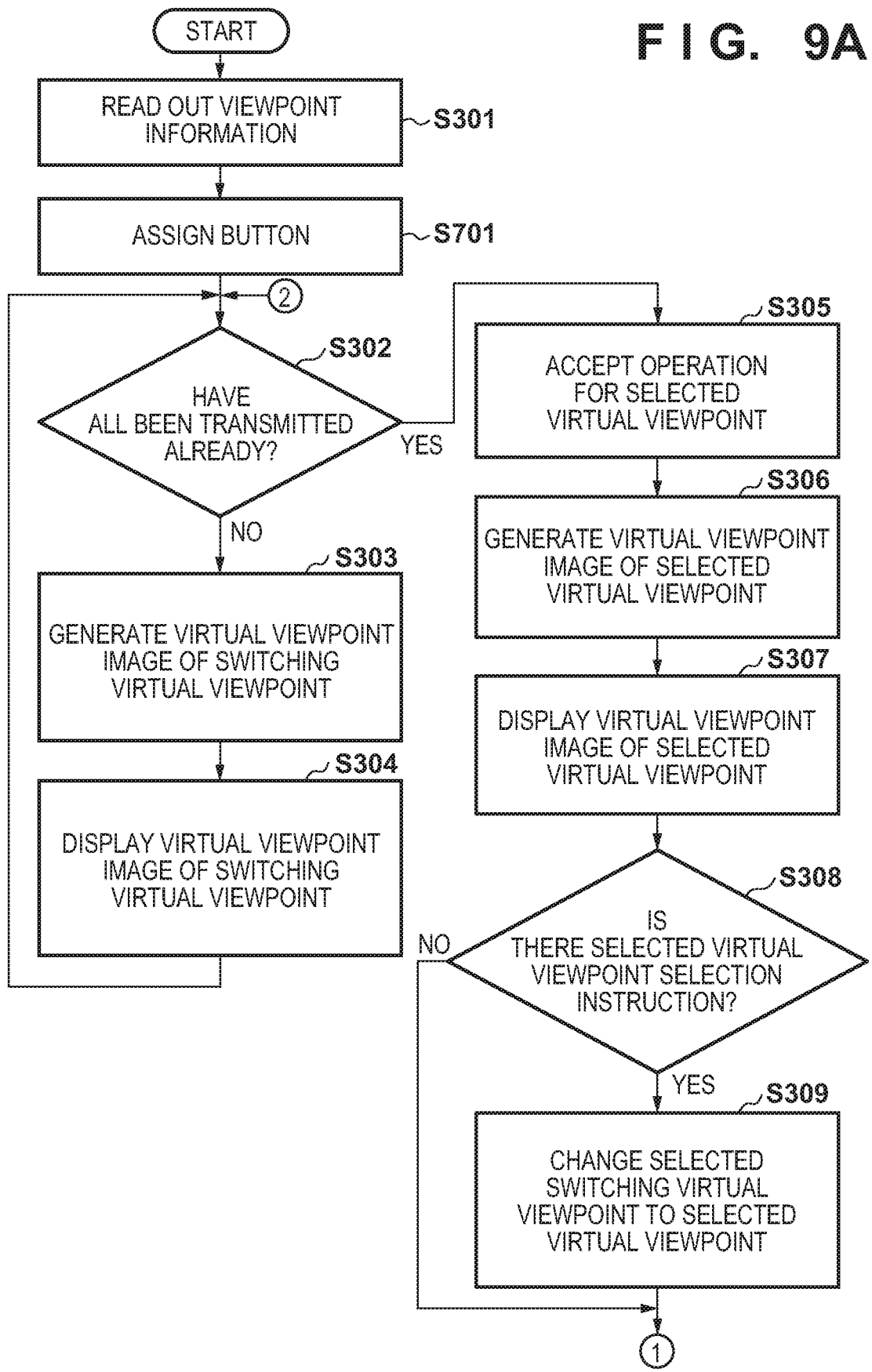
FIG. 9A is a flowchart illustrating processing executed by a system.
Figure 9B:
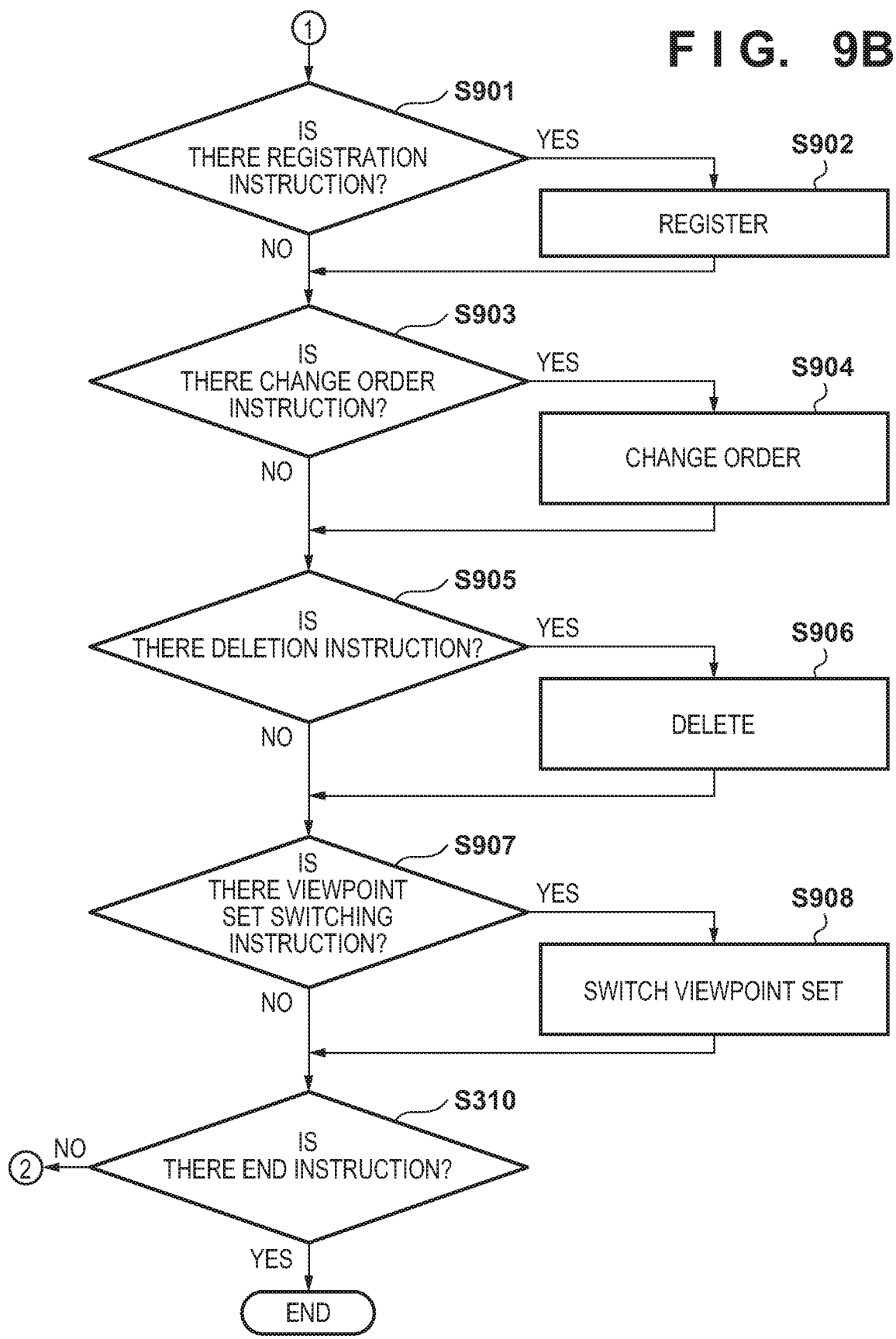
FIG. 9B is a flowchart illustrating the processing executed by the system.

In this embodiment, it is possible to perform an editing operation on the table information. In this embodiment, the arrangement of the system according to the second embodiment is used. Processing executed by the system according to this embodiment will be described with reference to flowcharts shown in FIGS. 9A and 9B. The processing according to the flowcharts shown in FIGS. 9A and 9B starts in a state in which a virtual viewpoint setting application is activated, and is executed until the virtual viewpoint setting application ends. In FIGS. 9A and 9B, the same step numbers as those in FIGS. 3 and 7 denote the same processing steps and a description thereof will be omitted.

In step S901, an input unit 205 determines whether the user has input an instruction (registration instruction) to register in the table information the position, direction, and angle of view of the current selected virtual viewpoint by operating an operation unit 107. A registration instruction input method is not limited to a specific one. For example, the registration instruction may be input when the user instructs a registration button displayed on a display screen of a display unit 105 by operating the operation unit 107 or when the user presses a specific button in the operation unit 107. If, as a result of the determination processing, the registration instruction has been input, the process advances to step S902; otherwise, the process advances to step S903.

In step S902, a management unit 201 issues a new viewpoint ID, generates new viewpoint information including the issued viewpoint ID, a viewpoint type "switching virtual viewpoint", and the second position, second direction, and second angle of view included in the current selected viewpoint information, and registers the generated viewpoint information in the table information. The management unit 201 also registers, in the table information, information indicating which of display regions 403 to 406 is used to display a virtual viewpoint image corresponding to the registered virtual viewpoint or information indicating that the virtual viewpoint image is not displayed, or registers such information as that separated from the table information.

In step S903, the input unit 205 determines whether the user has input an instruction (rearrangement instruction) to change the arrangement order of the virtual viewpoint images displayed in the display regions 403 to 406 by operating the operation unit 107. If, as a result of the determination processing, the arrangement instruction has been input, the process advances to step S904; otherwise, the process advances to step S905.

In step S904, a control unit 204 changes the arrangement order of the virtual viewpoint images displayed in the display regions 403 to 406 in accordance with an operation input by the operating the operation unit 107 by the user. The operation performed by the user for this rearrangement is not limited to a specific operation. For example, if the user instructs a change button displayed on the display screen of the display unit 105 by operating the operation unit 107, the input unit 205 accepts the operation instruction for the virtual viewpoint images displayed in the display regions 403 to 406. Note that if the user presses a specific button in the operation unit 107, the input unit 205 may accept the operation instruction for the virtual viewpoint images displayed in the display regions 403 to 406.

Assume, for example, that the user drags the virtual viewpoint image in the display region 404 to move to the display region 406 by operating the operation unit 107. In this case, the control unit 204 moves the virtual viewpoint images displayed in the display regions 405 and 406 to the display regions 404 and 405, respectively. Furthermore, the control unit 204 moves, to the display region 406, the virtual viewpoint image (the virtual viewpoint image displayed in the display region 404) dragged to the display region 406. At this time, the management unit 201 changes the correspondence between each display region and each switching virtual viewpoint.

Assume, for example, that the user drags the virtual viewpoint image in the display region 404 to move to the outside of a display region 401 by operating the operation unit 107. In this case, the control unit 204 moves the virtual viewpoint images displayed in the display regions 405 and 406 to the display regions 404 and 405, respectively. The management unit 201 sets, in a non-display state, the viewpoint type of the virtual viewpoint image dragged and moved to the outside of the display region 401, and deletes a non-display state from the viewpoint type of the switching virtual viewpoint with a viewpoint ID=413 whose viewpoint type is set in the non-display state. Then, a virtual viewpoint image corresponding to the switching virtual viewpoint with the viewpoint ID=413 is generated and displayed in the display region 406, as described above. Note that there are provided various operations as an operation of rearranging the virtual viewpoint images corresponding to the switching virtual viewpoints, and the rearrangement operation is not limited to a specific one.

In step S905, the input unit 205 determines whether an instruction (deletion instruction) to delete one of the virtual viewpoint images displayed in the display regions 403 to 406 has been input by operating the operation unit 107 by the user. If, as a result of the determination processing, the deletion instruction has been input, the process advances to step S906; otherwise, the process advances to step S907.

In step S906, the management unit 201 deletes, from the table information, the viewpoint information of the virtual viewpoint as a target of the deletion instruction, and the control unit 204 erases, from the display screen of the display unit 105, the virtual viewpoint image corresponding to the virtual viewpoint as the target of the deletion instruction. An operation executed by the user for the deletion is not limited to a specific one. For example, if the user instructs a deletion button displayed on the display screen of the display unit 105 by operating the operation unit 107, the input unit 205 accepts an operation instruction for the virtual viewpoint images displayed in the display regions 403 to 406. Note that if the user presses a specific button in the operation unit 107, the input unit 205 may accept the operation instruction for the virtual viewpoint images displayed in the display regions 403 to 406.

If, for example, the user designates the display region 404 by operating the operation unit 107, the management unit 201 deletes, from the table information, the viewpoint information of the switching virtual viewpoint corresponding to the virtual viewpoint image displayed in the display region 404. Then, the control unit 204 erases the virtual viewpoint image from the display region 404.

In step S907, the input unit 205 determines whether the user has input an instruction (viewpoint set switching instruction) to switch the viewpoint information of the switching virtual viewpoint in the table information to the viewpoint information of another switching virtual viewpoint by operating the operation unit 107. If, for example, a viewpoint set switching button displayed on the display screen of the display unit 105 or a specific button in the operation unit 107 is pressed, the input unit 205 determines that the viewpoint set switching instruction has been input. If, as a result of the determination processing, the viewpoint set switching instruction has been input, the process advances to step S908: otherwise, the process advances to step S310.

In step S908, the management unit 201 creates in advance viewpoint information whose viewpoint type is "switching virtual viewpoint" in the table information, and replaces the created viewpoint information by one of virtual viewpoint sets registered in an HDD 104. The virtual viewpoint set indicates one or more pieces of viewpoint information of virtual viewpoints, as will be described alter. One or a plurality of virtual viewpoint sets may be registered in the HDD 104.

If one virtual viewpoint set is registered in the HDD 104, the management unit 201 replaces, by the one virtual viewpoint set, the viewpoint information whose viewpoint type is "switching virtual viewpoint" in the table information.

If a plurality of virtual viewpoint sets are registered in the HDD 104, the management unit 201 replaces, by one of the plurality of virtual viewpoint set, the viewpoint information whose viewpoint type is "switching virtual viewpoint" in the table information. A method of selecting one of the plurality of virtual viewpoint sets to be used for the replacement is not limited to a specific one. For example, the control unit 204 displays, on the display screen of the display unit 105, a list in which contents of the plurality of virtual viewpoint sets and file names are described. When the user selects one of the plurality of virtual viewpoint sets by operating the operation unit 107 while seeing the display screen, the management unit 201 replaces, by the selected virtual viewpoint set, the viewpoint information whose viewpoint type is "switching virtual viewpoint" in the table information.

The arrangement in which the plurality of virtual viewpoint sets are provided and one of the virtual viewpoint sets is selected and used assumes, for example, a case in which the operator of the virtual viewpoint uses the virtual viewpoint set in accordance with the status of a performance. For example, it is usable to prepare in advance a virtual viewpoint set for a corner kick, that for kick-off, that for a penalty kick, and the like. For the virtual viewpoint set for a penalty kick, it is convenient to prepare, as a set, a virtual viewpoint for seeing from the goal side to the direction of a penalty spot, a virtual viewpoint in an opposite direction, a virtual viewpoint for seeing the goal side over the penalty spot, a virtual viewpoint for seeing a bench, and the like. Note that if the table information is changed in step S908, the management unit 201 reads out the viewpoint information of each switching virtual viewpoint registered in the changed table information, and outputs the viewpoint information of each switching virtual viewpoint to the output unit 202.

FIGS. 14A and 14B show examples of the virtual viewpoint sets. FIG. 14A shows an example of the arrangement of each of virtual viewpoint sets 1401, 1402, and 1403. The pieces of viewpoint information of four switching virtual viewpoints are registered in the virtual viewpoint set 1401. The pieces of viewpoint information of three switching virtual viewpoints are registered in the virtual viewpoint set 1402. The pieces of viewpoint information of five switching virtual viewpoints are registered in the virtual viewpoint set 1403.

FIG. 14B shows an example of the structure of the table information obtained by replacing, by the virtual viewpoint set 1401, the viewpoint information whose viewpoint type is "switching virtual viewpoint" in the table information shown in FIG. 5 if the virtual viewpoint set 1401 is selected in step S908. In the table information shown in FIG. 14B, the number of switching virtual viewpoints decreases to four, as compared with the table information shown in FIG. 5, the position, direction, and angle of view are replaced by the values in the virtual viewpoint set 1401, and viewpoint IDs are newly assigned (413 to 416). Note that the selected virtual viewpoint remains unchanged by this operation, and thus the same values as in FIG. 5 are maintained.

Fourth Embodiment

In the first to third embodiments, the frame rate of the virtual viewpoint image displayed in the display region 402 is equal to that of the virtual viewpoint images displayed in the display regions 403 to 406. However, the frame rates of the virtual viewpoint images of all the virtual viewpoints need not be equal to each other. To generate a virtual viewpoint image by the image generation apparatus 110, it is necessary to read out many data and perform data processing. Consequently, an enormous computer resource is required to generate the virtual viewpoint images corresponding to all of the selected virtual viewpoint and switching virtual viewpoints at 60 fps (frames/sec), as described in the first to third embodiments, thereby increasing the cost. In this embodiment, frame rate control in consideration of the image generation capability of an image generation apparatus 110 will be described.

Figure 10:
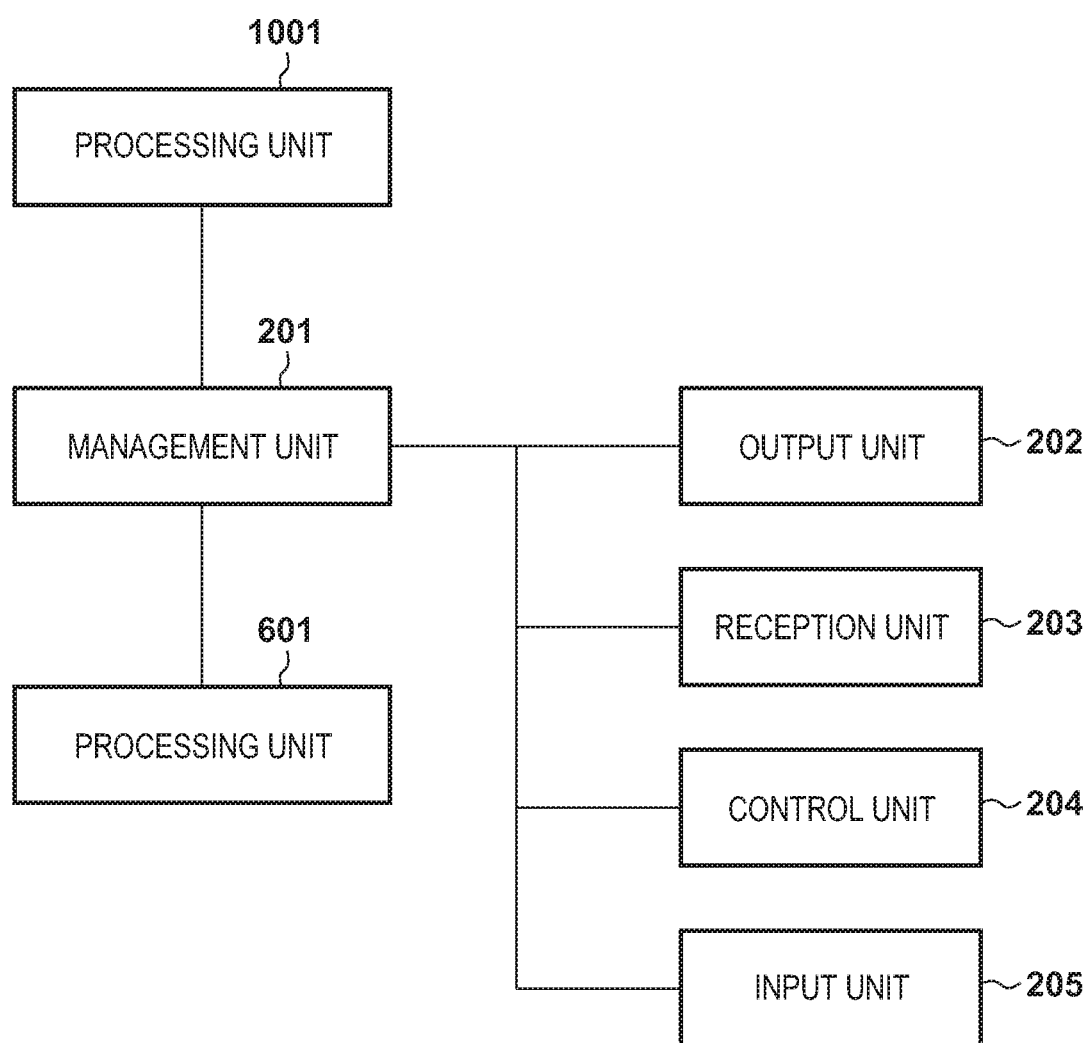
FIG. 10 is a block diagram showing an example of the functional arrangement of a display control apparatus 100.

An example of the functional arrangement of a display control apparatus 100 according to this embodiment will be described with reference to a block diagram shown in FIG. 10. In FIG. 10, the same reference numerals as those in FIGS. 2 and 6 denote similar functional units and a description thereof will be omitted.

A processing unit 1001 sets the frame rate of a virtual viewpoint image corresponding to a selected virtual viewpoint and the frame rate of virtual viewpoint images corresponding to switching virtual viewpoints in accordance with the image generation capability of the image generation apparatus 110.

Figure 11A:
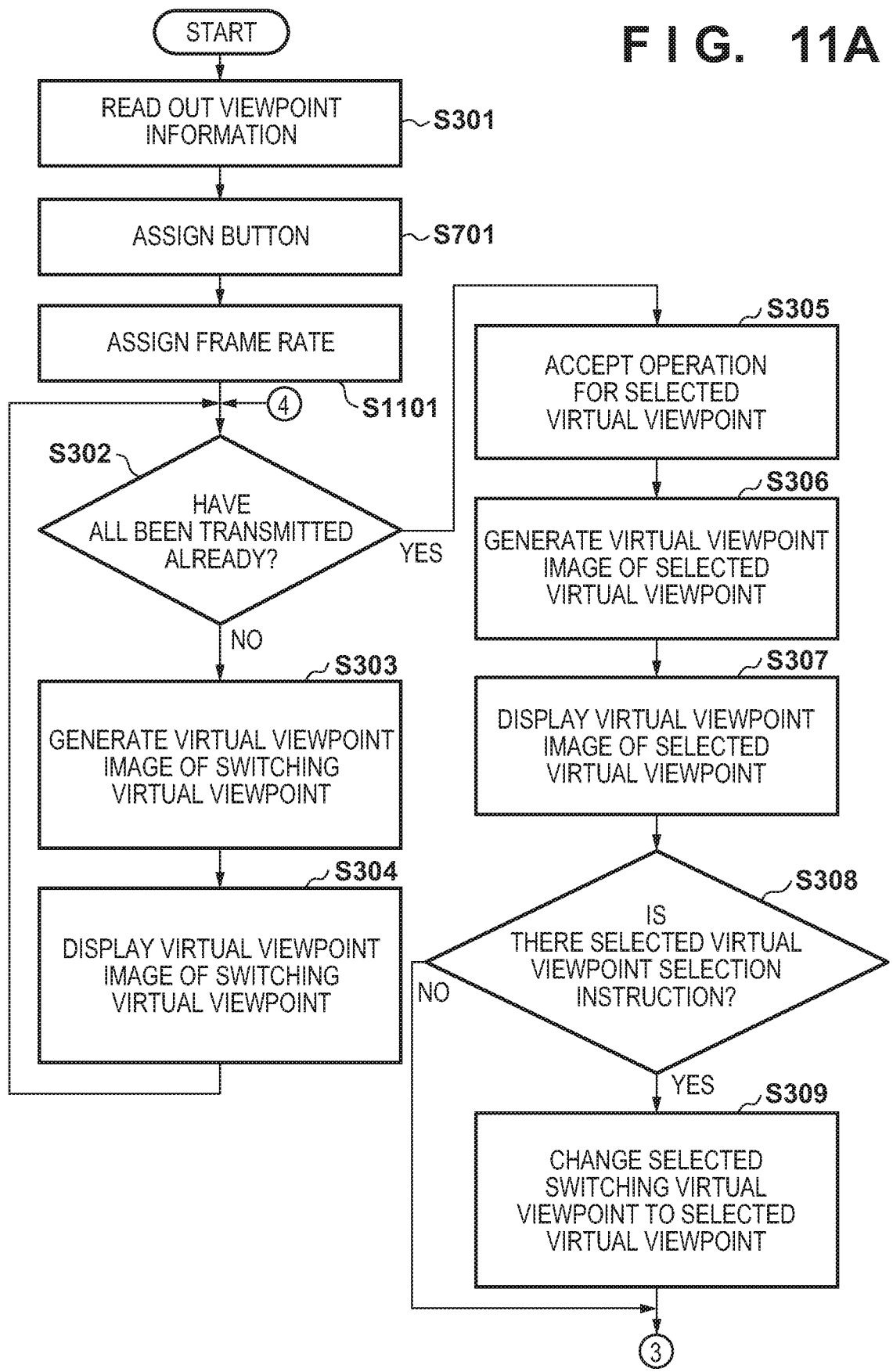
FIG. 11A is a flowchart illustrating processing executed by a system.
Figure 11B:
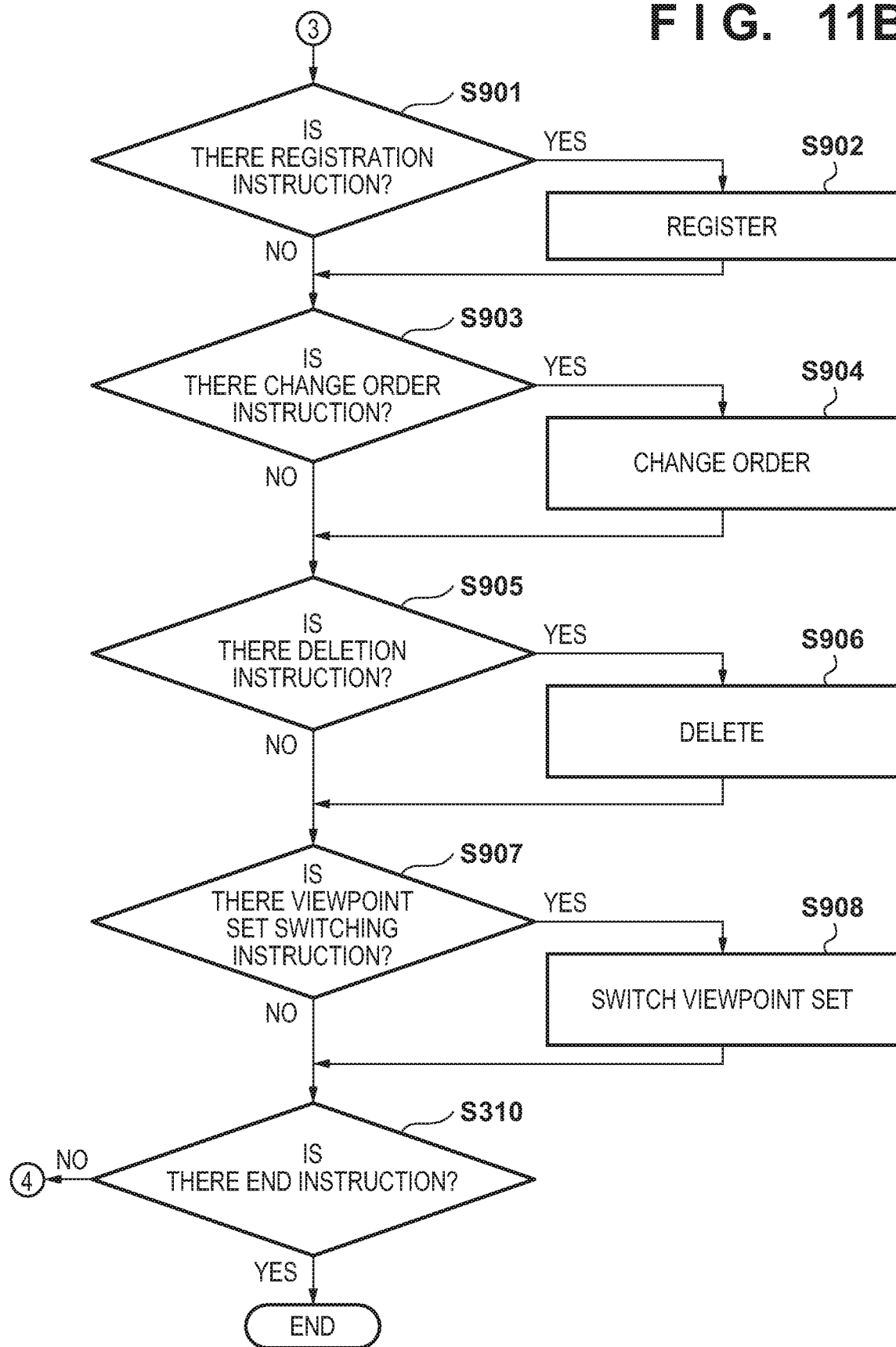
FIG. 11B is a flowchart illustrating the processing executed by the system.

Processing executed by a system according to this embodiment will be described with reference to flowcharts shown in FIGS. 11A and 11B. The processing according to the flowcharts shown in FIGS. 11A and 11B starts in a state in which a virtual viewpoint setting application is activated, and is executed until the virtual viewpoint setting application ends. In FIGS. 11A and 11B, the same step numbers as those in FIGS. 3, 7, 9A, and 9B denote the same processing steps and a description thereof will be omitted.

In step S1101, the processing unit 1001 sets, for each virtual viewpoint registered in table information, the frame rate of a virtual viewpoint image corresponding to the virtual viewpoint. Note that in step S303 according to this embodiment, an output unit 202 outputs, to the image generation apparatus 110 via a communication I/F 106, viewpoint information corresponding to a virtual viewpoint image to be generated in the current frame among the pieces of viewpoint information of the switching virtual viewpoints output from a management unit 201. In step S306 according to this embodiment, if the current frame is a frame for generating a virtual viewpoint image corresponding to the selected virtual viewpoint, the output unit 202 transmits selected viewpoint information to the image generation apparatus 110 via the communication I/F 106.

The processing in step S1101 will be described using a practical example. Assume that the image generation capability of the image generation apparatus 110 is 120 fps (it is possible to generate images of 120 frames per sec). A case in which there exist the one selected virtual viewpoint and the four switching virtual viewpoints, as shown in FIG. 5, is considered.

Figures 12A, 12B:
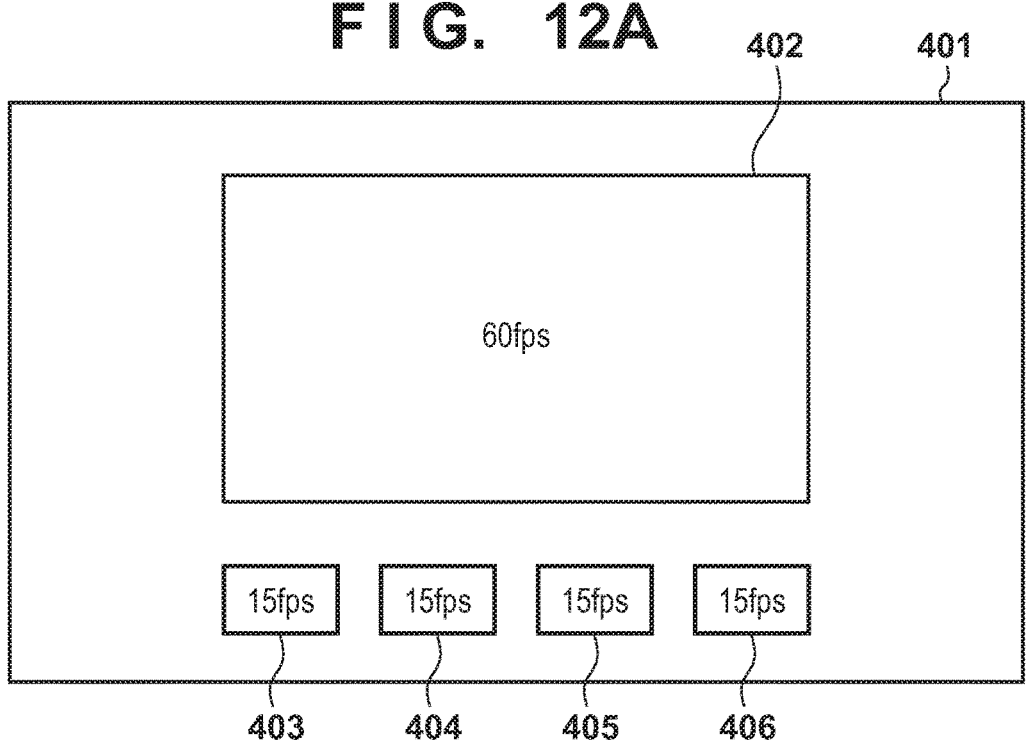
FIG. 12A is a view for explaining the fourth embodiment.
FIG. 12B is a table for explaining the fourth embodiment.

The virtual viewpoint image corresponding to the selected virtual viewpoint is an essential image for the operation of the selected virtual viewpoint, and it is necessary to display, as a virtual viewpoint image, a result of designating the selected virtual viewpoint without delay. It is understood that as the delay time from when the selected virtual viewpoint is designated until the virtual viewpoint image is displayed becomes longer, it becomes more difficult to operate the selected virtual viewpoint. Therefore, 60 fps is assigned to the selected virtual viewpoint, and the remaining 60 fps is distributed proportionally to the four switching virtual viewpoints. That is, as shown in FIG. 12A, the virtual viewpoint image corresponding to the selected virtual viewpoint is generated at 60 fps and displayed in a display region 402, and the virtual viewpoint images corresponding to the switching virtual viewpoints are generated at 15 fps and displayed in display regions 403 to 406, respectively. Display of the virtual viewpoint image corresponding to each switching virtual viewpoint is not so smooth but the frame rate is enough to grasp what is seen at the virtual viewpoint. In this embodiment, if the frame rate for each virtual viewpoint is decided in step S1101, the frame rate for each virtual viewpoint is registered in the table information managed by the management unit 201, as shown in FIG. 12B.

The virtual viewpoint image of each frame generated by the image generation apparatus 110 in steps S303 and S306 will be described with reference to FIGS. 13A to 13F. Since the image generation capability of the image generation apparatus 110 is 120 fps and the frame rate of the virtual viewpoint image corresponding to the selected virtual viewpoint is 60 fps, the virtual viewpoint image corresponding to the selected virtual viewpoint is generated and displayed once per two frames. In FIGS. 13A to 13F, the virtual viewpoint image corresponding to the selected virtual viewpoint is generated and displayed for the first frame, and is thus generated and displayed for the (2×f+1)th (f is an integer of 1 or more) frame thereafter.

Furthermore, since the image generation capability of the image generation apparatus 110 is 120 fps and the frame rate of the virtual viewpoint image corresponding to each of the four switching virtual viewpoints is 15 fps, the virtual viewpoint image corresponding to each switching virtual viewpoint is generated and displayed once per eight frames. For example, in FIGS. 13A to 13F, the virtual viewpoint image corresponding to switching virtual viewpoint 1 is generated and displayed for the second frame, and is thus generated and displayed for the (8×f+2)th frame thereafter. Similarly, switching virtual viewpoints 2, 3, and 4 are displayed for the four, sixth, and eighth frames, and are then generated and displayed for the (8×f+4)th frame, (8×f+6)th frame, and (8×f+8)th frame thereafter.

Therefore, the output unit 202 outputs, to the image generation apparatus 110, viewpoint information of a virtual viewpoint corresponding to a virtual viewpoint image to be generated and displayed for the current frame, and the image generation apparatus 110 generates a virtual viewpoint image corresponding to the viewpoint information received from the output unit 202. By equally distributing the timings of generating the virtual viewpoint images, it is possible to display the images more smoothly.

Note that the above numerical values are merely examples used to describe the practical example. The above operation is not limited to the numerical values. That is, the numerical values are set appropriately in accordance with the capability of the system and the requirements of a broadcasting system that broadcasts a virtual viewpoint image.

As described above, according to this embodiment, the frame rate for generating a virtual viewpoint is distributed appropriately to the selected virtual viewpoint and the switching virtual viewpoints, thereby making it possible to implement the operation of the virtual viewpoint and selection of the virtual viewpoint according to the performance or the like without increasing the computer resource.

Fifth Embodiment

In the first to fourth embodiments, the virtual viewpoint image corresponding to the selected virtual viewpoint and the virtual viewpoint images corresponding to the switching virtual viewpoints are displayed on one display screen. The present invention, however, is not limited to this. For example, the virtual viewpoint image corresponding to the selected virtual viewpoint and the virtual viewpoint images corresponding to the switching virtual viewpoints may be displayed on separate display devices.

In the third and fourth embodiments, the virtual viewpoint registration processing, rearrangement processing, deletion processing, and viewpoint set switching processing are performed in the processing loop of generation and display of the virtual viewpoint image. The present invention, however, is not limited to this. For example, the virtual viewpoint registration processing, rearrangement processing, deletion processing, and viewpoint set switching processing may be performed in threads different from the processing loop of generation and display of the virtual viewpoint image.

Note that some or all of the above-described embodiments and modifications may be used in combination appropriately. Alternatively, some or all of the above-described embodiments and modifications may be selectively used.

Other Embodiments

An arrangement according to the present invention can allow the user to select an appropriate virtual viewpoint.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A display control apparatus comprising:
an acquisition unit configured to acquire a plurality of virtual viewpoint images corresponding to positions and directions of a plurality of virtual viewpoints; and
a display control unit configured to display the plurality of virtual viewpoint images acquired by the acquisition unit on an operation screen for an operation associated with the position and direction of the virtual viewpoint,
wherein the virtual viewpoint image corresponding to the virtual viewpoint selected as a position and direction operation target among the plurality of virtual viewpoints is generated based on a plurality of captured images obtained by capturing an image capturing target region by a plurality of cameras, and is transmitted to another apparatus.

2. The display control apparatus according to claim 1, wherein the virtual viewpoint image is transmitted to the other apparatus by broadcasting.

3. The display control apparatus according to claim 1, wherein the display control unit displays the virtual viewpoint image corresponding to the virtual viewpoint selected by the user among the plurality of virtual viewpoints larger than the virtual viewpoint images corresponding to the virtual viewpoints unselected by the user among the plurality of virtual viewpoints.

4. The display control apparatus according to claim 1, wherein the virtual viewpoint images corresponding to the virtual viewpoints unselected by the user among the plurality of virtual viewpoints are generated by generation processing with a load smaller than a load for the virtual viewpoint image corresponding to the virtual viewpoint selected by the user among the plurality of virtual viewpoints.

5. The display control apparatus according to claim 1, wherein the display control unit displays the virtual viewpoint image corresponding to the virtual viewpoint selected by the user among the plurality of virtual viewpoints at a frame rate higher than a frame rate of the virtual viewpoint images corresponding to the virtual viewpoints unselected by the user among the plurality of virtual viewpoints.

6. The display control apparatus according to claim 1, further comprising an acceptance unit configured to accept an operation for selecting, from the plurality of virtual viewpoints corresponding to the plurality of virtual viewpoint images displayed by the display control unit, the virtual viewpoint as a position and direction operation target by the user.

7. The display control apparatus according to claim 1, further comprising an acceptance unit configured to accept a user operation for changing the position and direction of the virtual viewpoint selected by the user among the plurality of virtual viewpoints corresponding to the plurality of virtual viewpoint images displayed by the display control unit.

8. The display control apparatus according to claim 1, further comprising a reception unit configured to receive a signal corresponding to a pressed button from an input device in which a plurality of buttons and the plurality of virtual viewpoints are respectively associated with each other,
wherein the selection is performed based on the signal received by the reception unit.

9. A display control apparatus comprising:
an acquisition unit configured to acquire a plurality of virtual viewpoint images corresponding to positions and directions of a plurality of virtual viewpoints; and
a display control unit configured to display the plurality of virtual viewpoint images acquired by the acquisition unit on an operation screen for an operation associated with the position and direction of the virtual viewpoint,
wherein at least one of the plurality of virtual viewpoint images displayed on the operation screen by the display control unit is an image generated based on a plurality of captured images obtained by capturing an image capturing target region by a plurality of cameras, and
in response to a user operation for adding a virtual viewpoint, the display control unit newly displays a virtual viewpoint image corresponding to a position and direction of the virtual viewpoint on the operation screen.

10. A display control apparatus comprising:
an acquisition unit configured to acquire a plurality of virtual viewpoint images corresponding to positions and directions of a plurality of virtual viewpoints; and
a display control unit configured to display the plurality of virtual viewpoint images acquired by the acquisition unit on an operation screen for an operation associated with the position and direction of the virtual viewpoint,
wherein at least one of the plurality of virtual viewpoint images displayed on the operation screen by the display control unit is an image generated based on a plurality of captured images obtained by capturing an image capturing target region by a plurality of cameras, and
in response to a predetermined user operation, the display control unit switches from a state in which a plurality of first virtual viewpoint images corresponding to a plurality of first virtual viewpoints are displayed on the operation screen to a state in which a plurality of second virtual viewpoint images corresponding to a plurality of second virtual viewpoints are displayed on the operation screen.

11. A display control apparatus comprising:
an acquisition unit configured to acquire a plurality of virtual viewpoint images corresponding to positions and directions of a plurality of virtual viewpoints; and
a display control unit configured to display the plurality of virtual viewpoint images acquired by the acquisition unit on an operation screen for an operation associated with the position and direction of the virtual viewpoint,
wherein at least one of the plurality of virtual viewpoint images displayed on the operation screen by the display control unit is an image generated based on a plurality of captured images obtained by capturing an image capturing target region by a plurality of cameras, and
in response to a user operation for deleting a virtual viewpoint, the display control unit controls not to display, on the operation screen, a virtual viewpoint image corresponding to a position and direction of the virtual viewpoint.

12. A display control apparatus comprising:
an acquisition unit configured to acquire a plurality of virtual viewpoint images corresponding to positions and directions of a plurality of virtual viewpoints; and
a display control unit configured to display the plurality of virtual viewpoint images acquired by the acquisition unit on an operation screen for an operation associated with the position and direction of the virtual viewpoint,
wherein at least one of the plurality of virtual viewpoint images displayed on the operation screen by the display control unit is an image generated based on a plurality of captured images obtained by capturing an image capturing target region by a plurality of cameras, and
in response to a user operation for rearranging virtual viewpoint images, the display control unit changes a display order of at least some of the plurality of virtual viewpoint images displayed on the operation screen.

13. A display control method for a display control apparatus, comprising:
acquiring a plurality of virtual viewpoint images corresponding to positions and directions of a plurality of virtual viewpoints; and
displaying the plurality of virtual viewpoint images acquired in the acquisition on an operation screen for an operation associated with the position and direction of the virtual viewpoint,
wherein the virtual viewpoint image corresponding to the virtual viewpoint selected as a position and direction operation target among the plurality of virtual viewpoints is generated based on a plurality of captured images obtained by capturing an image capturing target region by a plurality of cameras, and is transmitted to another apparatus.

14. The display control method according to claim 13, wherein the virtual viewpoint image is transmitted to the other apparatus by broadcasting.

15. The display control method according to claim 13, wherein in the displaying, the virtual viewpoint image corresponding to the virtual viewpoint selected by the user among the plurality of virtual viewpoints is displayed larger than the virtual viewpoint images corresponding to the virtual viewpoints unselected by the user among the plurality of virtual viewpoints.

16. The display control method according to claim 13, the virtual viewpoint images corresponding to the virtual viewpoints unselected by the user among the plurality of virtual viewpoints are images generated by generation processing with a load smaller than a load for the virtual viewpoint image corresponding to the virtual viewpoint selected by the user among the plurality of virtual viewpoints.

17. A display control method for a display control apparatus, comprising:
   acquiring a plurality of virtual viewpoint images corresponding to positions and directions of a plurality of virtual viewpoints; and
   displaying the plurality of virtual viewpoint images acquired in the acquisition on an operation screen for an operation associated with the position and direction of the virtual viewpoint,
   wherein at least one of the plurality of virtual viewpoint images displayed on the operation screen is an image generated based on a plurality of captured images obtained by capturing an image capturing target region by a plurality of cameras, and
   in response to a user operation for adding a virtual viewpoint, a virtual viewpoint image corresponding to a position and direction of the virtual viewpoint is newly displayed on the operation screen.

18. A display control method for a display control apparatus, comprising:
   acquiring a plurality of virtual viewpoint images corresponding to positions and directions of a plurality of virtual viewpoints; and
   displaying the plurality of virtual viewpoint images acquired in the acquisition on an operation screen for an operation associated with the position and direction of the virtual viewpoint,
   wherein at least one of the plurality of virtual viewpoint images displayed on the operation screen is an image generated based on a plurality of captured images obtained by capturing an image capturing target region by a plurality of cameras, and
   in response to a predetermined user operation, a state in which a plurality of first virtual viewpoint images corresponding to a plurality of first virtual viewpoints are displayed on the operation screen is switched to a state in which a plurality of second virtual viewpoint images corresponding to a plurality of second virtual viewpoints are displayed on the operation screen.

19. A display control method for a display control apparatus, comprising:
   acquiring a plurality of virtual viewpoint images corresponding to positions and directions of a plurality of virtual viewpoints; and
   displaying the plurality of virtual viewpoint images acquired in the acquisition on an operation screen for an operation associated with the position and direction of the virtual viewpoint,
   wherein at least one of the plurality of virtual viewpoint images displayed on the operation screen is an image generated based on a plurality of captured images obtained by capturing an image capturing target region by a plurality of cameras, and
   in response to a user operation for deleting a virtual viewpoint, it is controlled not to display, on the operation screen, a virtual viewpoint image corresponding to a position and direction of the virtual viewpoint as a deletion target.

20. A display control method for a display control apparatus, comprising:
   acquiring a plurality of virtual viewpoint images corresponding to positions and directions of a plurality of virtual viewpoints; and
   displaying the plurality of virtual viewpoint images acquired in the acquisition on an operation screen for an operation associated with the position and direction of the virtual viewpoint,
   wherein at least one of the plurality of virtual viewpoint images displayed on the operation screen is an image generated based on a plurality of captured images obtained by capturing an image capturing target region by a plurality of cameras, and
   in response to a user operation for rearranging virtual viewpoint images, a display order of at least some of the plurality of virtual viewpoint images displayed on the operation screen is changed.

21. A non-transitory computer-readable storage medium for storing a computer program for causing a computer to function as:
   an acquisition unit configured to acquire a plurality of virtual viewpoint images corresponding to positions and directions of a plurality of virtual viewpoints; and
   a display control unit configured to display the plurality of virtual viewpoint images acquired by the acquisition unit on an operation screen for an operation associated with the position and direction of the virtual viewpoint,
   wherein the virtual viewpoint image corresponding to the virtual viewpoint selected as a position and direction operation target among the plurality of virtual viewpoints is generated based on a plurality of captured images obtained by capturing an image capturing target region by a plurality of cameras, and is transmitted to another apparatus.

22. A non-transitory computer-readable storage medium for storing a computer program for causing a computer to function as:
   an acquisition unit configured to acquire a plurality of virtual viewpoint images corresponding to positions and directions of a plurality of virtual viewpoints; and
   a display control unit configured to display the plurality of virtual viewpoint images acquired by the acquisition unit on an operation screen for an operation associated with the position and direction of the virtual viewpoint,
   wherein at least one of the plurality of virtual viewpoint images displayed on the operation screen by the display control unit is an image generated based on a plurality of captured images obtained by capturing an image capturing target region by a plurality of cameras, and
   in response to a user operation for adding a virtual viewpoint, the display control unit newly displays a virtual viewpoint image corresponding to a position and direction of the virtual viewpoint on the operation screen.

23. A non-transitory computer-readable storage medium for storing a computer program for causing a computer to function as:
an acquisition unit configured to acquire a plurality of virtual viewpoint images corresponding to positions and directions of a plurality of virtual viewpoints; and
a display control unit configured to display the plurality of virtual viewpoint images acquired by the acquisition unit on an operation screen for an operation associated with the position and direction of the virtual viewpoint,
wherein at least one of the plurality of virtual viewpoint images displayed on the operation screen by the display control unit is an image generated based on a plurality of captured images obtained by capturing an image capturing target region by a plurality of cameras, and
in response to a predetermined user operation, the display control unit switches from a state in which a plurality of first virtual viewpoint images corresponding to a plurality of first virtual viewpoints are displayed on the operation screen to a state in which a plurality of second virtual viewpoint images corresponding to a plurality of second virtual viewpoints are displayed on the operation screen.

24. A non-transitory computer-readable storage medium for storing a computer program for causing a computer to function as:
an acquisition unit configured to acquire a plurality of virtual viewpoint images corresponding to positions and directions of a plurality of virtual viewpoints; and
a display control unit configured to display the plurality of virtual viewpoint images acquired by the acquisition unit on an operation screen for an operation associated with the position and direction of the virtual viewpoint,
wherein at least one of the plurality of virtual viewpoint images displayed on the operation screen by the display control unit is an image generated based on a plurality of captured images obtained by capturing an image capturing target region by a plurality of cameras, and
in response to a user operation for deleting a virtual viewpoint, the display control unit controls not to display, on the operation screen, a virtual viewpoint image corresponding to a position and direction of the virtual viewpoint.

25. A non-transitory computer-readable storage medium for storing a computer program for causing a computer to function as:
an acquisition unit configured to acquire a plurality of virtual viewpoint images corresponding to positions and directions of a plurality of virtual viewpoints; and
a display control unit configured to display the plurality of virtual viewpoint images acquired by the acquisition unit on an operation screen for an operation associated with the position and direction of the virtual viewpoint,
wherein at least one of the plurality of virtual viewpoint images displayed on the operation screen by the display control unit is an image generated based on a plurality of captured images obtained by capturing an image capturing target region by a plurality of cameras, and
in response to a user operation for rearranging virtual viewpoint images, the display control unit changes a display order of at least some of the plurality of virtual viewpoint images displayed on the operation screen.

* * * * *